United States Patent
Raza et al.

(10) Patent No.: US 9,989,724 B2
(45) Date of Patent: Jun. 5, 2018

(54) DATA CENTER NETWORK

(71) Applicant: Fiber Mountain, Inc., Cheshire, CT (US)

(72) Inventors: Mohammad H. Raza, Cheshire, CT (US); David G. Stone, Irvine, CA (US); Aristito Lorenzo, Plantsville, CT (US); Ronald M Plante, Prospect, CT (US); John R. Lagana, West Nyack, NY (US); Phuc Minh Ly, Waterbury, CT (US)

(73) Assignee: Fiber Mountain, Inc., Cheshire, CT (US)

( * ) Notice: Subject to any disclaimer, the term of this patent is extended or adjusted under 35 U.S.C. 154(b) by 0 days. days.

(21) Appl. No.: 14/869,177

(22) Filed: Sep. 29, 2015

(65) Prior Publication Data
US 2016/0091685 A1 Mar. 31, 2016

Related U.S. Application Data

(60) Provisional application No. 62/057,086, filed on Sep. 29, 2014, provisional application No. 62/057,008, filed on Sep. 29, 2014.

(51) Int. Cl.
*G02B 6/44* (2006.01)
*H04Q 11/00* (2006.01)

(52) U.S. Cl.
CPC ....... *G02B 6/4452* (2013.01); *H04Q 11/0005* (2013.01); *H04Q 11/0066* (2013.01); *H04Q 2011/0052* (2013.01); *H04Q 2011/0083* (2013.01)

(58) Field of Classification Search
CPC .............. H04J 14/0227; H04J 14/0283; H04Q 2011/0083; H04Q 11/0005; H04Q 11/0062; H04Q 2011/0052; H04Q 11/0066; G02B 6/4452
See application file for complete search history.

(56) References Cited

U.S. PATENT DOCUMENTS

| | | |
|---|---|---|
| 5,101,151 A | 3/1992 | Beaufils et al. |
| 5,457,556 A | 10/1995 | Shiragaki |
| 5,493,565 A | 2/1996 | Hanson et al. |
| 5,838,681 A | 11/1998 | Bonomi et al. |
| 5,892,770 A | 4/1999 | Wolf et al. |

(Continued)

FOREIGN PATENT DOCUMENTS

WO 2013171042 A1 11/2013

OTHER PUBLICATIONS

International Search Report and Written Opinion, mailed in PCT/US15/12795 on by ISA/US dated May 18, 2015.

(Continued)

*Primary Examiner* — Ted Wang
(74) *Attorney, Agent, or Firm* — Wissing Miller LLP

(57) ABSTRACT

The present disclosure provides a data center network having one or more data center rows, where each row has one or more racks, and each rack has one or more network devices, such as servers, storage devices and switches. The rows and racks are interconnected by a fiber interconnect core that reduces the number of switching nodes in the data center network, and reduces the individual path latency, the overall data center network cost, power consumption, and power and cooling requirements.

19 Claims, 32 Drawing Sheets

(56) References Cited

U.S. PATENT DOCUMENTS

| | | | |
|---|---|---|---|
| 6,067,585 | A | 6/2000 | Hoang |
| 6,188,702 | B1 | 2/2001 | Tornetta et al. |
| 6,243,510 | B1 | 6/2001 | Rauch |
| 6,980,725 | B1 | 12/2005 | Swieconek |
| 7,226,217 | B1 | 6/2007 | Benton et al. |
| 7,277,425 | B1 | 10/2007 | Sikdar |
| 7,492,714 | B1 | 2/2009 | Liao et al. |
| 7,606,494 | B1 | 10/2009 | Weston-Dawkes et al. |
| 7,772,975 | B2 | 8/2010 | Downie et al. |
| 7,782,202 | B2 | 8/2010 | Downie et al. |
| 7,965,186 | B2 | 6/2011 | Downie et al. |
| 8,138,925 | B2 | 3/2012 | Downie et al. |
| 8,264,366 | B2 | 9/2012 | Chamarti et al. |
| 8,421,626 | B2 | 4/2013 | Downie et al. |
| 8,873,967 | B2 * | 10/2014 | Barnes ............... G02B 6/4453 385/24 |
| 9,159,012 | B2 | 10/2015 | Downie et al. |
| 2001/0015839 | A1 | 8/2001 | Koh et al. |
| 2003/0026205 | A1 | 2/2003 | Mullendore et al. |
| 2003/0030866 | A1 | 2/2003 | Yoo |
| 2004/0029417 | A1 | 2/2004 | Engel et al. |
| 2006/0018329 | A1 | 1/2006 | Nielsen et al. |
| 2006/0148279 | A1 | 7/2006 | German et al. |
| 2006/0186926 | A1 | 8/2006 | Yager et al. |
| 2006/0251419 | A1 | 11/2006 | Zadikian et al. |
| 2007/0291535 | A1 | 12/2007 | Eberle et al. |
| 2008/0101229 | A1 | 5/2008 | Meleis et al. |
| 2009/0074414 | A1 | 3/2009 | Miles et al. |
| 2009/0226181 | A1 | 9/2009 | Fingler et al. |
| 2010/0098412 | A1 | 4/2010 | Boyd et al. |
| 2010/0211664 | A1 | 4/2010 | Raza et al. |
| 2010/0129078 | A1 | 5/2010 | Weston-Dawkes et al. |
| 2010/0142544 | A1 | 6/2010 | Chapel et al. |
| 2010/0211665 | A1 | 8/2010 | Raza et al. |
| 2010/0211697 | A1 | 8/2010 | Raza et al. |
| 2010/0215049 | A1 | 8/2010 | Raza et al. |
| 2010/0266117 | A1 | 10/2010 | Enge et al. |
| 2011/0092100 | A1 | 4/2011 | Coffey et al. |
| 2011/0116748 | A1 | 5/2011 | Smrha et al. |
| 2011/0188383 | A1 | 8/2011 | Koziy et al. |
| 2011/0228473 | A1 | 9/2011 | Anderson et al. |
| 2011/0255829 | A1 | 10/2011 | Anderson et al. |
| 2012/0008945 | A1 | 1/2012 | Singla et al. |
| 2012/0069839 | A1 | 3/2012 | Kunz et al. |
| 2012/0219005 | A1 | 8/2012 | Durve et al. |
| 2012/0243554 | A1 | 9/2012 | Sybesma et al. |
| 2012/0246362 | A1 | 9/2012 | Anne et al. |
| 2013/0148976 | A1 | 6/2013 | Patel et al. |
| 2013/0177309 | A1 | 7/2013 | El-Ahmadi et al. |
| 2013/0179622 | A1 | 7/2013 | Pratt et al. |
| 2013/0194005 | A1 | 8/2013 | Voutilainen et al. |
| 2014/0019662 | A1 | 1/2014 | Coffey |
| 2014/0036920 | A1 | 2/2014 | McCormick et al. |
| 2014/0270762 | A1 | 9/2014 | Li et al. |
| 2014/0317249 | A1 | 10/2014 | Janakiraman et al. |

OTHER PUBLICATIONS

International Search Report and Written Opinion, mailed in PCT/US15/23077 on by ISA/US dated Jul. 7, 2015.
LHCB Online System Data Acquisition & Experiment Control. 2001. [retrieved on Sep. 4, 2015]. Retrieved from the Internet:<URL: http://lhcb-comp.web.cem.ch/lhcb-comp/General/Publications/onlinetdr.pdf>.
International Search Report and Written Opinion, mailed in PCT/US15/39045 on by ISA/US dated Oct. 2, 2015.
International Search Report and the Written Opinion of the International Searching Authority mailed in PCT/US2015/052924 dated Feb. 2, 2016.
International Search Report and Written Opinion, mailed in PCT/US2015/052847 by ISA/US dated Jun. 30, 2016.
International Search Report and Written Opinion, mailed in PCT/US2016/026714 by ISA/US dated Jul. 12, 2016.

* cited by examiner

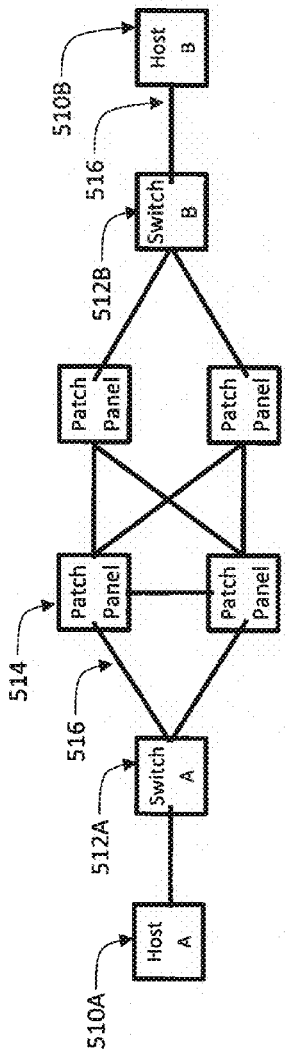
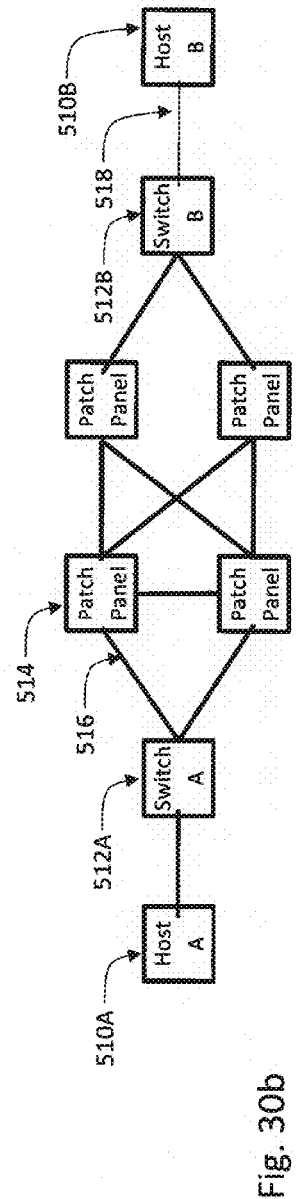
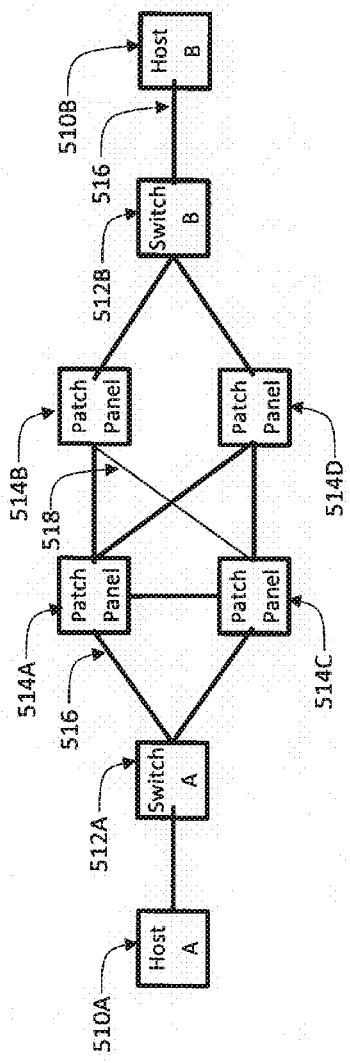
Fig. 30a
Fig. 30b
Fig. 30c

DATA CENTER NETWORK

CROSS-REFERENCE TO RELATED APPLICATIONS

This application claims priority U.S. Provisional Application No. 62/057,086, filed on Sep. 29, 2014, entitled "Data Center Network," and U.S. Provisional Application No. 62/057,008, filed on Sep. 29, 2014, entitled "System for Increasing Fiber Port Density in Data Center Applications" both of which are incorporated herein in their entirety by reference.

BACKGROUND ART

Field

The present application relates generally to communication networks, and more particularly to data center networks with improved interconnections and improved interconnection management.

Description of the Related Art

Communication networks have a long history, evolving from single transmission lines and manual switching, to early multi-line automatic electro-mechanical switching systems, to more recent electronic and optical transmissions across many lines or fibers using electronic or optical switching systems.

Today's digital and optical switching systems allow for substantial growth in the size of communication networks to meet the needs of ever expanding communication networks. The progression to the more common digital and optical switching systems was spurred on a belief that newer semiconductor (e.g., VLSI) and optical devices met the need for high speed data transmissions.

With the evolution of communication switching systems has been the evolution of computers and the information age. In order to manage the increase in data transmissions between computers, data centers came to be. Data centers have their roots in the huge computer rooms built during the early ages of the computing industry. Early computer systems were complex to operate and maintain, and required a special environment in which to operate. During the boom of the microcomputer industry in the 1980s, computers started to be deployed everywhere and systems, such as dedicated computers or servers, were developed to meet the demands created by the need to have the increasing number of computers communicate. During the latter part of the $20^{th}$ century and early part of the $21^{st}$ century, data centers grew significantly to meet the needs of the Internet Age. To maintain business continuity and grow revenue, companies needed fast Internet connectivity and nonstop operations to establish a presence on the Internet.

Today, data centers are built within the enterprise network, a service provider network, or a shared, colocation facility where the networks of many disparate owners reside. With the significant increase in business and individual use of the Internet, and the significant need for bandwidth to transmit high volumes of data, especially video and graphics, data centers are again under pressure to evolve to handle the boom in growth. However, data centers are typically very expensive to build, operate and maintain, and data center operators are searching for ways to reduce costs while increasing data processing and transmission capabilities, while meeting all reliability requirements.

In order to meet the increased demands, data center network architectures have changed. Sometimes the changes to the network architecture require significant rerouting of network connections, and sometimes the network architecture needs to be dynamic, changing frequently. And, all this has to be achieved at today's fast rates with little or no failures or delays in the transmission of data.

One area where the data center network is changing is with network switches that have evolved with the capability of switching data traffic on a packet-by-packet basis, which is known as packet switching. While packet switching can change the physical route of individual packets through a network, there are some network applications where the requirement is to switch all the data traffic from one physical route to a second physical route through the network, which is known as port switching or path switching.

Traditionally, data center network devices, such as servers, storage devices, switches, and routers, as well as NIC cards that may be added to such devices have physical connection points to transmit and receive data. These connection points generally include a transceiver and a connector, which are often referred to as a port. Ports can be copper or fiber ports that are built into the device, or the ports can be plug-in modules that contain the transceiver and connector and that plug into Small Form Factor (SFF) cages intended to accept the plug-in transceiver/connector module, such as SFP, SFP+, QSFP, CFP, CXP, and other transceiver/connector modules, where the connector extends from an exterior surface of the device, e.g., from a front panel. Fiber ports may be low density or single fiber ports, such as FC, SC, ST, LC, or the fiber ports may be higher density MPO, MXC, or other high density fiber ports.

Fiber optic cabling with the low density FC, SC, ST, or LC connectors or with SFP, SFP+, QSFP, CFP, CXP or other modules either connect directly to the data center network devices, or they pass through interconnector cross connect patch panels before getting to the data center network devices. The cross connect patch panels have equivalent low density FC, SC, ST, or LC connectors, and may aggregate individual fiber strands into high density MPO, MXC or other connectors that are primarily intended to reduce the quantity of smaller cables run to alternate panels or locations.

From a logical perspective, traditional data center networks, as shown in FIG. 1, includes of servers 104 and storage devices 106, plus connections between the servers, storage devices and to external interfaces. A data center interconnects these devices by means of a switching topology implemented by pathway controlling devices 130, such as switches and routers. As networks grow in size, so does the complexity. The servers 104 and storage devices 106 connect to one another via cable interfaces 118, 120, 122, and 124. Interconnects 112 are used to bundle and reconfigure cable connections between endpoints in cable bundles 114, 116, and 126. The Management Controller 100 configures and controls and receives status information from the data center network devices via management interface path 101. As can be seen in FIG. 1, data center networks become layered with multiple pathway controlling devices 130 in an attempt for every endpoint to have the capability of switching and/or routing data packets to any other endpoint within the data center network. This can result in very complex hierarchical switching networks which in turn require considerable power and expense in order to maintain and respond to configuration changes within the network.

From a physical perspective, a typical data center network configuration, shown in FIG. 2, includes multiple rows of cabinets, where each cabinet encloses a rack of one or more network devices, e.g., switches 102, servers 104 and storage devices 106. Typically, for each rack there is a top-of-rack (TOR) switch 102 that consolidates data packet traffic in the rack from each server 104 and storage 106 via cables 140 and transports the data packet traffic to a switch known as an end-of-row (EOR) switch 108 via cables (not shown). The EOR switch is typically larger than a TOR switch, and it processes data packets and switches or routes the data packets to a final destination or to a next stage in the data center network, which in turn may process the data packets for transmission outside the data center network. Typically, there are two TOR switches 102 for every rack in a row, e.g. Rows 1 and 2, and two EOR switches 108 for each row, where the second switch in each case is typically for redundancy purposes.

In one configuration, a TOR switch 102 will switch data packet traffic directly between any two network devices, e.g., servers 104 or storage devices 106, within a given rack. Any data packet traffic destined for locations outside of the rack is sent to the EOR switch 108. The EOR switch 108 will send data packet traffic destined for a network device in a different rack in the same row to the TOR switch 102 of the rack where the network device resides. The TOR switch 102 within the destination rack will then forward the data packet traffic to the intended network device, i.e., the destination device. If the data packet traffic is for network devices outside of the row, e.g., Row 1, the EOR switch 108 will forward the traffic to core switch 110 for further transmission.

In other configurations, a TOR switch 102 may be used as an aggregator, where all data packet traffic is collected and forwarded to an EOR switch 108. The EOR switch then determines the location of the destination network device, and routes the data packet traffic back to the same TOR switch 102 if the data packet traffic is destined for a network device in that rack, to a different TOR switch 102 in a different rack if the traffic is destined for a network device in a different rack in the same row, or to the core switch 110 if the destination of the data packet traffic is outside of that row.

The TOR switch 102 may couple the entire data packet traffic from an ingress port to an egress port, or may selectively select individual packets to send to an egress port. Referring to FIG. 3, in conventional applications, a TOR switch 102 retrieves header information of an incoming data packets on an ingress port of the TOR switch, and then performs Access Control List (ACL) functions to determine if a packet has permission to pass through the TOR switch 102. Next, a check is run to see if a connection path was previously based on the information from within the packet header. If not, then TOR switch 102 may run Open Shortest Path First (OSPF), Border Gateway Protocol (BGP), Routing Information Protocol (RIP), or other algorithms to determine if the destination port is reachable by the TOR switch 102. If the TOR switch 102 cannot create a route to the destination network device, the packet is dropped. If the destination network device is reachable, the TOR switch 102 creates a new table entry with the egress port number, corresponding egress header information, and forwards the data packet to the egress port. Using this methodology, the TOR switch 102 transfers, or switches, the data packet from the ingress port to the required egress port.

Traditional data center architectures have not had the capability to map out the physical interconnections between pathway controlling devices 130, servers 104, storage devices 106, and other devices in the data center network. Existing network applications, such as Address Resolution Protocol (ARP), Spanning Tree, OSPF and others, map out logical interconnections between two devices connected together, but such network applications do not provide information about the physical interconnections. As a result, in the event of a link failure, the end devices are aware of the failure, but cannot identify the physical interconnection which requires repair.

BRIEF SUMMARY

The present disclosure provides a data center network comprising one or more rows, wherein each row has one or more racks, and wherein each of the one or more racks has at least one network device and at least one top-of-rack network switch, and at least one end-of-row fiber mesh interconnect in communication with each top-of-rack network switch within the same row of the one or more rows, such that each top-of-rack network switch has a direct connection to every other top-of-rack network switch within the same row. In an exemplary embodiment, each top-of-rack network switch comprises a housing having one or more connection panels, and a set of ports, wherein each port within the set of ports is configured to receive data streams from at least one network device within each of the one or more racks, and to transmit data streams to at least one network device within each of the one or more racks, wherein each port in the set of ports includes a connector and at least one transceiver optically coupled to the connector, and wherein the connector is mounted to the one or more connection panels for connecting to the at least one network device and the end-of-row fiber mesh interconnect.

The present disclosure also provides a data center network, comprising one or more rows, wherein each row has one or more racks, and wherein each of the one or more racks has at least one network device and at least one top-of-rack fiber mesh interconnect, and at least one end-of-row fiber mesh aggregation in communication with each top-of-rack fiber mesh interconnect within the same row of the one or more rows, such that each top-of-rack fiber mesh interconnect has a direct connection to every other top-of-rack fiber mesh interconnect within the same row. In an exemplary embodiment, each top-of-rack fiber mesh interconnect comprises a housing having one or more connection panels, wherein each connection panel includes a plurality of connectors, and a plurality of optical fibers within the housing and connected between one or more of the plurality of connectors in a predefined mapping to provide a direct optical fiber connection between connectors. In an exemplary embodiment, each end-of-row fiber mesh aggregation comprises a housing having one or more connection panels, wherein each connection panel includes a plurality of connectors, and a plurality of optical fibers within the housing and connected between one or more of the plurality of connectors in a predefined mapping to provide a direct optical fiber connection between connectors.

The present disclosure also provides a data center network fiber mesh interconnect device. The, fiber mesh interconnect device may comprise a housing having one or more connection panels, wherein each connection panel includes a plurality of connectors, and a plurality of optical fibers within the housing and connected between one or more of the plurality of connectors in a predefined mapping to provide a direct optical fiber connection between connectors.

BRIEF DESCRIPTION OF THE DRAWINGS

FIG. 30a is a block diagram of a data center network topology according to the present disclosure with identifiable connections;

FIG. 30b is a block diagram of a data center network according to the present disclosure with unidentifiable connections at the edges;

FIG. 30c is a block diagram of a data center network topology according to the present disclosure with unidentifiable connections in the network;

DETAILED DESCRIPTION

In this disclosure, a connection can be a single copper or fiber connection or a duplex connection having a transmit connection and a receive connection. For ease of drafting, reference to a connection or connections includes both a single connection or a duplex connection.

The data center network of the present disclosure provides a new class of high port density network switches. An example of a high density port network switch is provided in the description in U.S. Provisional Patent Application entitled "System For Increasing Fiber Port Density In Data Center Applications", Ser. No. 62/057,008, filed Sep. 29, 2014, which is incorporated herein in its entirety by reference. Utilizing the high port density network switch elevates the Top of Rack (TOR) switches 102 to High Density Top of Rack (HD TOR) 202 switches, and along with new fiber interconnection methodologies, can be configured as an interconnection fabric, replacing or significantly reducing the need for End of Row (EOR) switches 108 and in some cases core switches 110.

The data center network of the present disclosure creates a switch application including High Density Top of Rack switches 202 with direct connection of dedicated bandwidth to every other HD TOR switches 202 within a row and utilizing a new End of Row Fiber Interconnect Mesh 204 application. The End of Row Fiber Interconnect Mesh 204 comprises a fiber interconnect scheme containing prewired fiber connections configured for a particular data center row application and also provides multiple routes to other racks within the row, as well as connectivity to other rows and to the core.

Figure 12:
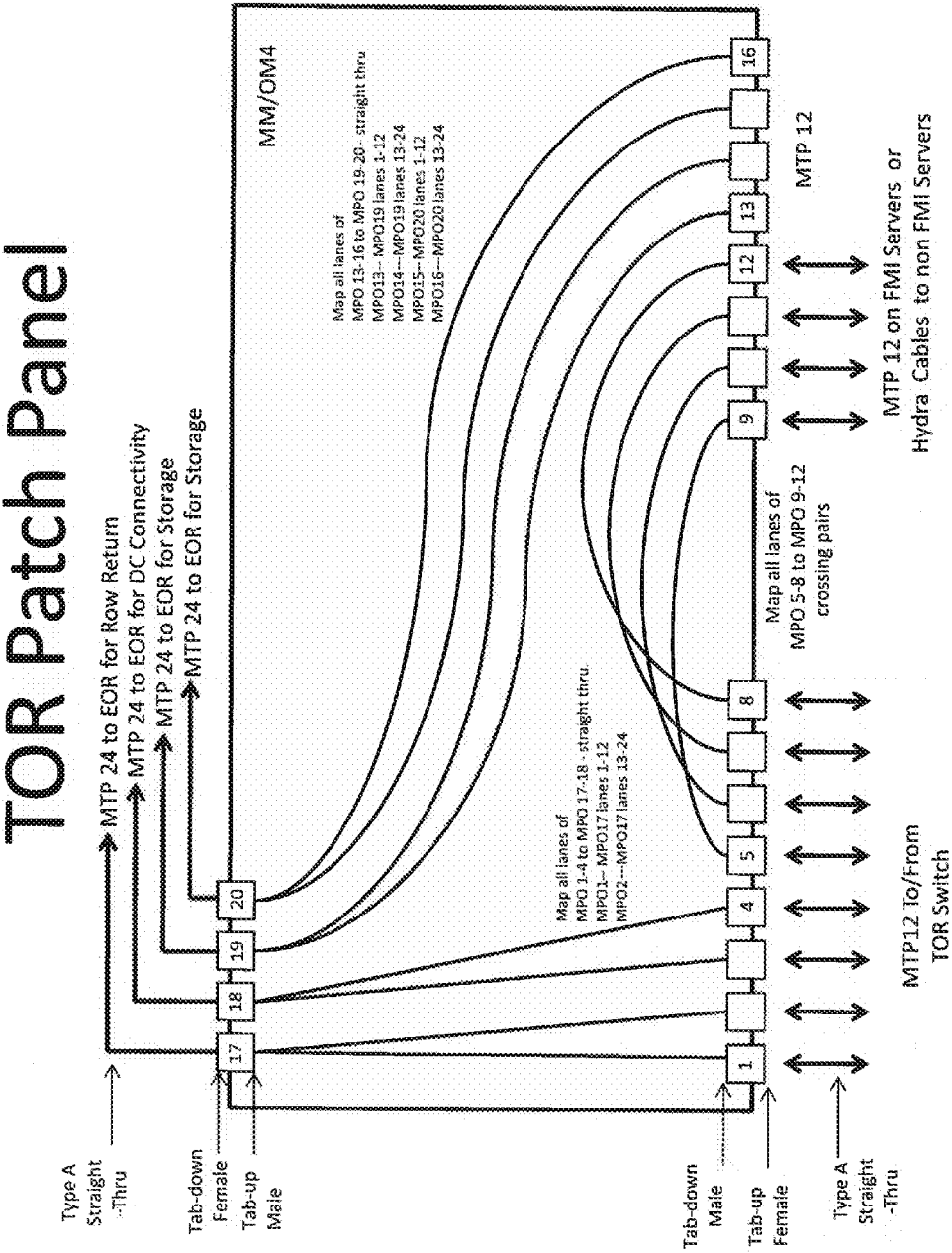
FIGS. 12-17 illustrate an embodiment of physical fiber mesh interconnection architecture according to the present disclosure.
Figure 13:
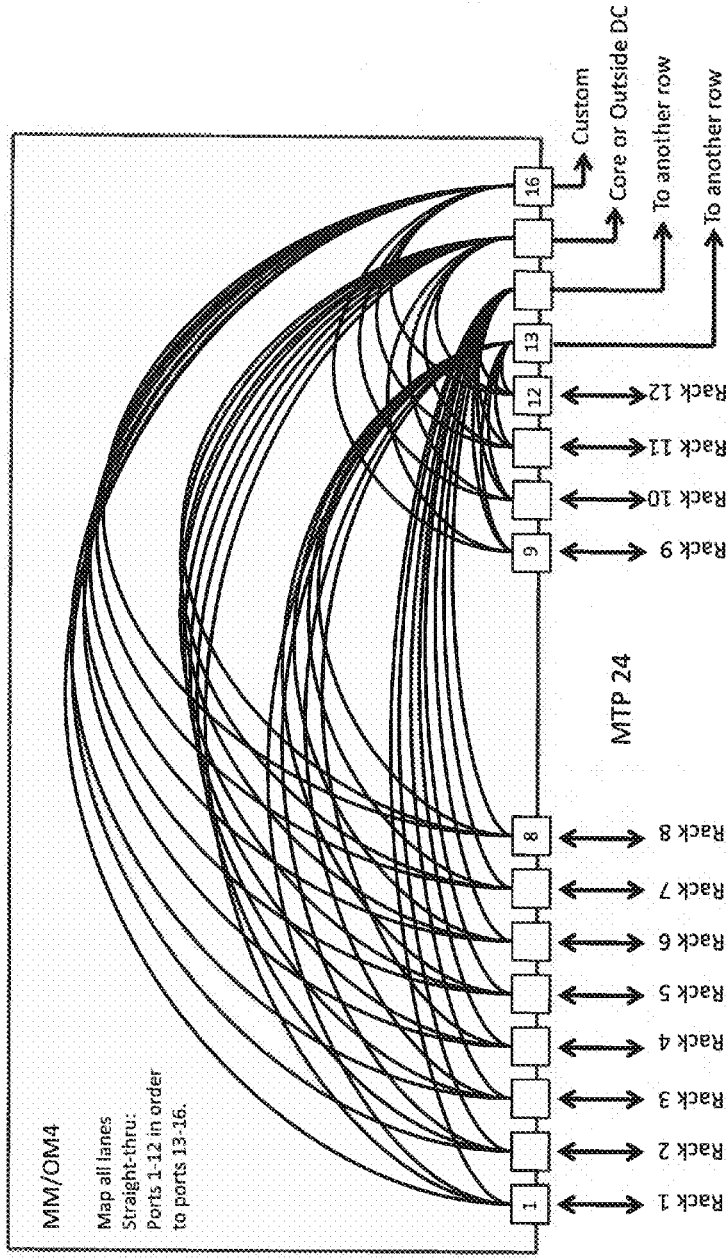
Figure 14:
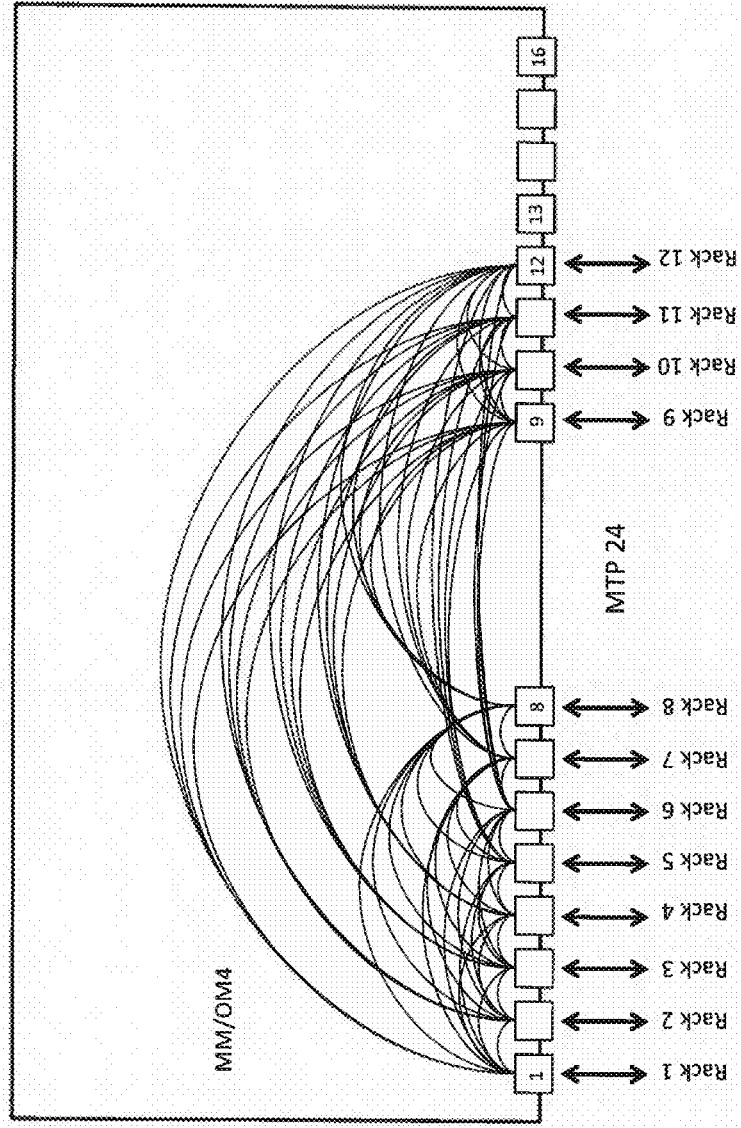
Figure 15:
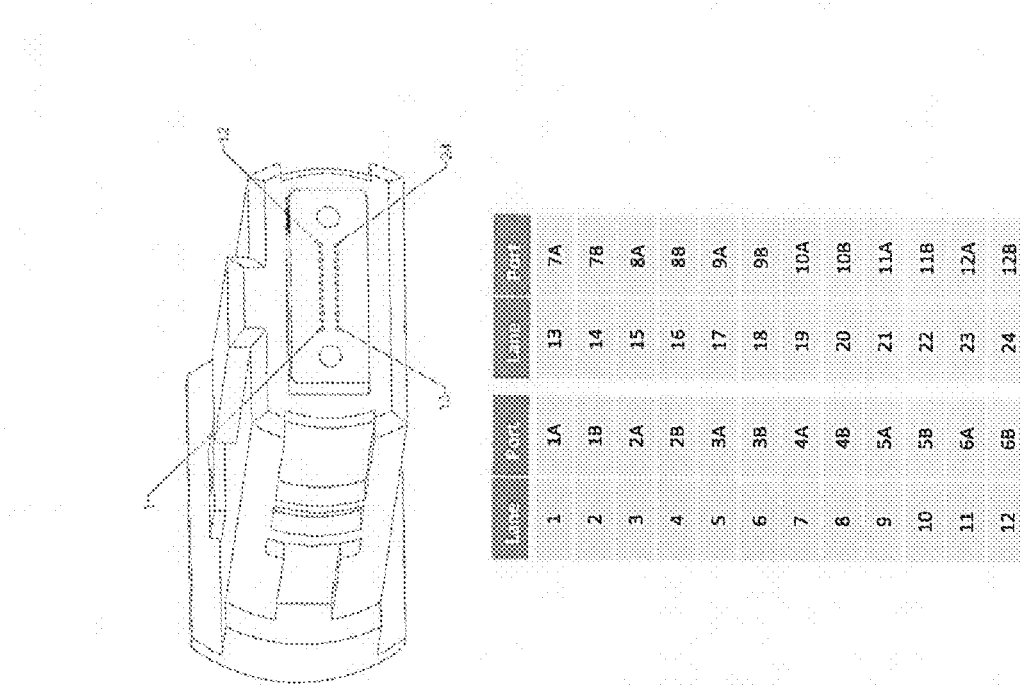
Figure 16:
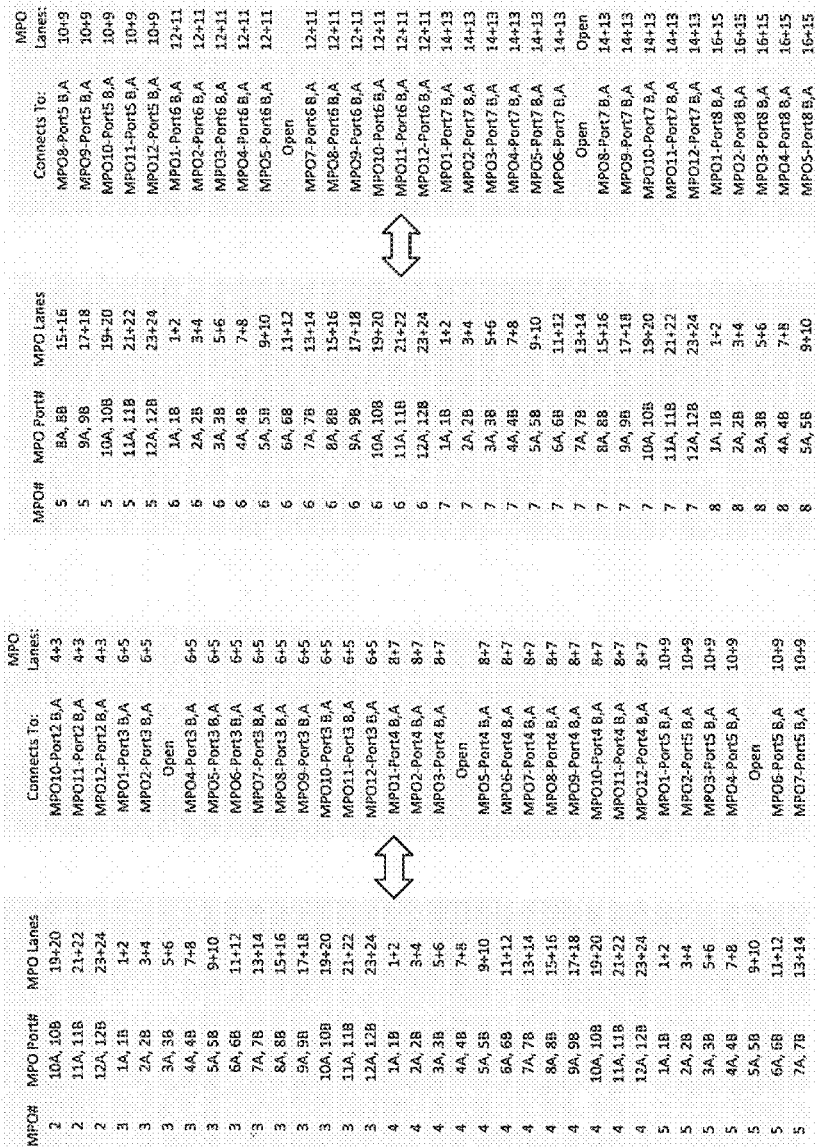
Figure 17:
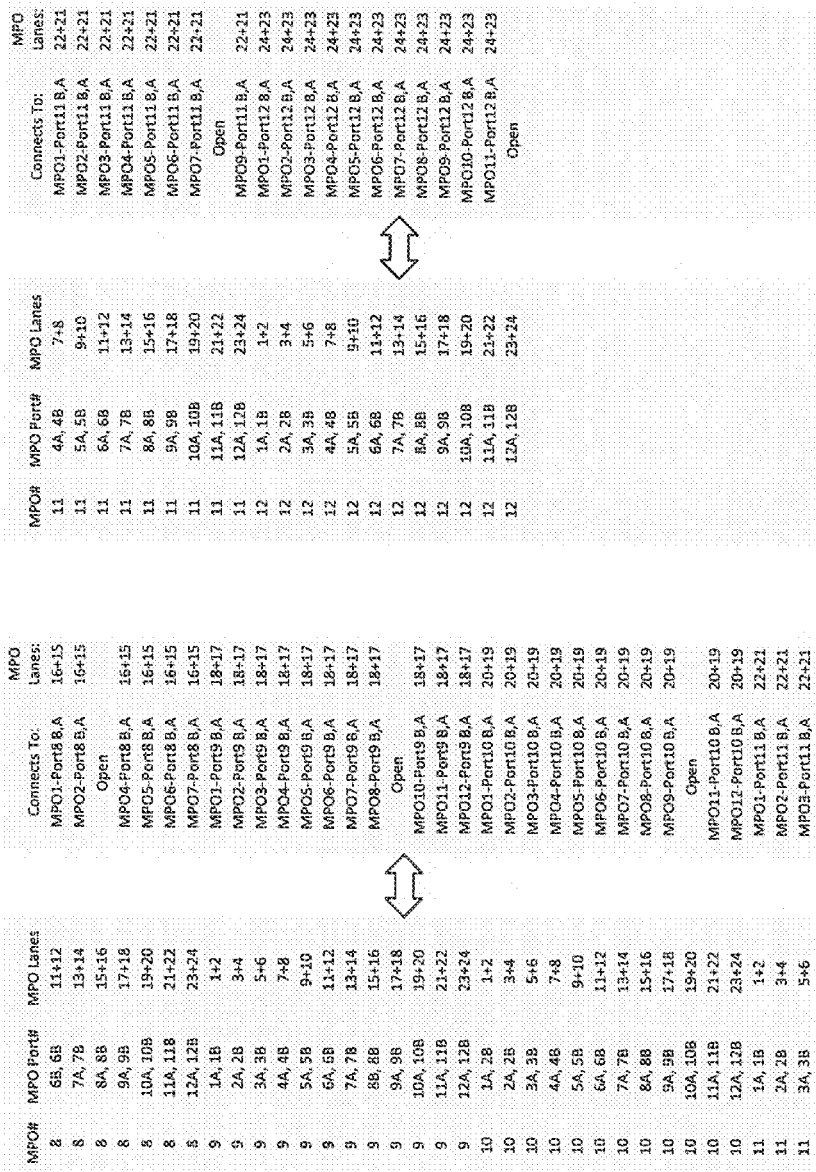

The overall physical network is managed by a Fiber Interconnect Mesh orchestration system 400 which can learn the logical and physical data center network topology, and can define paths through the interconnection fabric to provide efficient connections between endpoints. The HD TOR Switches 202 and EOR Aggregation 210 are different from conventional TOR Switches 102 and EOR Switches 108 in that they are designed to function with the End of Row Fiber Interconnect Mesh 204 and Top of Rack Fiber Mesh Interconnect 208. One embodiment of a network configuration implementing the present disclosure uses the fiber mesh interconnects 10 shown in FIGS. 12-17 for a 12 rack implementation where FIG. 12 is a Top of Rack Fiber Mesh Interconnect 208 which provides the connectivity for the individual top of rack interconnections, FIG. 13 and FIG. 14 show two fiber mesh interconnects 10 which create the End of Row Fiber Mesh Aggregation 210 implementation. FIG. 13 shows the End of Row fiber interconnections for connections to End of Row Fiber Mesh Aggregation modules 210 to other rows in the data center network, to the core switches 110, and to connections outside the network 134. FIG. 14 shows the End of Row-Row Return function where connections from one rack are looped back within the same row to Top of Rack Fiber Mesh Interconnects 208 or HD TOR Switches 202 in other rows. FIGS. 15-17 detail the fiber mapping for this embodiment of the Row Return function.

For traffic which has known destinations, when the end destination is known and reachable within a local environment, conventional pathway controlling devices 130 used to transmit data between two endpoints within a local region can be eliminated and replaced with direct cable connections. By physically connecting predefined traffic directly from one endpoint to another, the complexity of the network is reduced due to the reduction in the number of pathway controlling devices 130. Accordingly, the cost associated with conventional pathway controlling devices 130 is eliminated, the power consumption associated with these pathway controlling devices 130 is eliminated, the heat dissipation associated with these pathway controlling devices 130 is eliminated, and the real estate requirements in the data center associated with these pathway controlling devices 130 is significantly reduced and replaced by cables and or interconnect panels.

Figure 1:
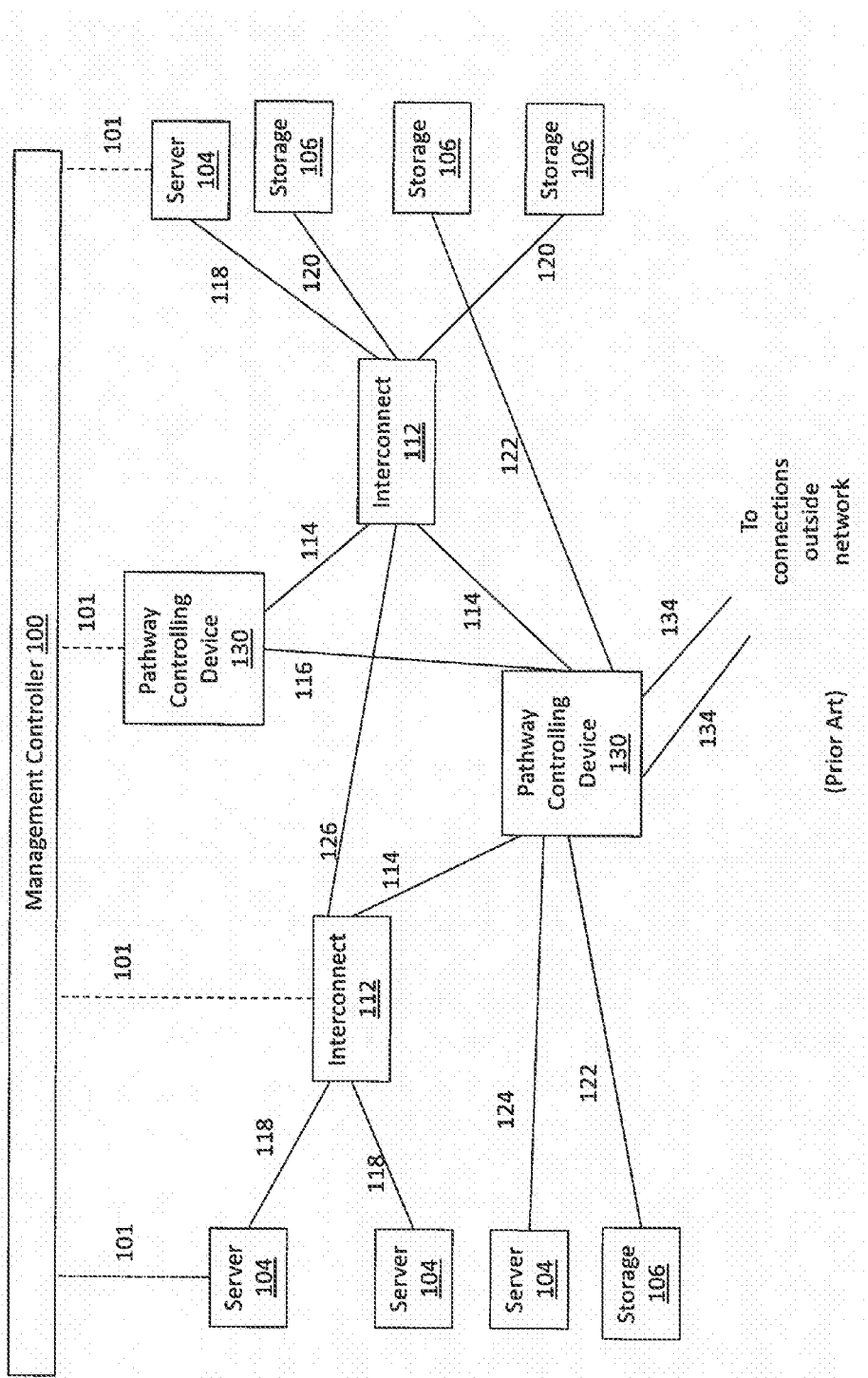
FIG. 1 is a block diagram of a conventional logical data center network topology.
Figure 2:
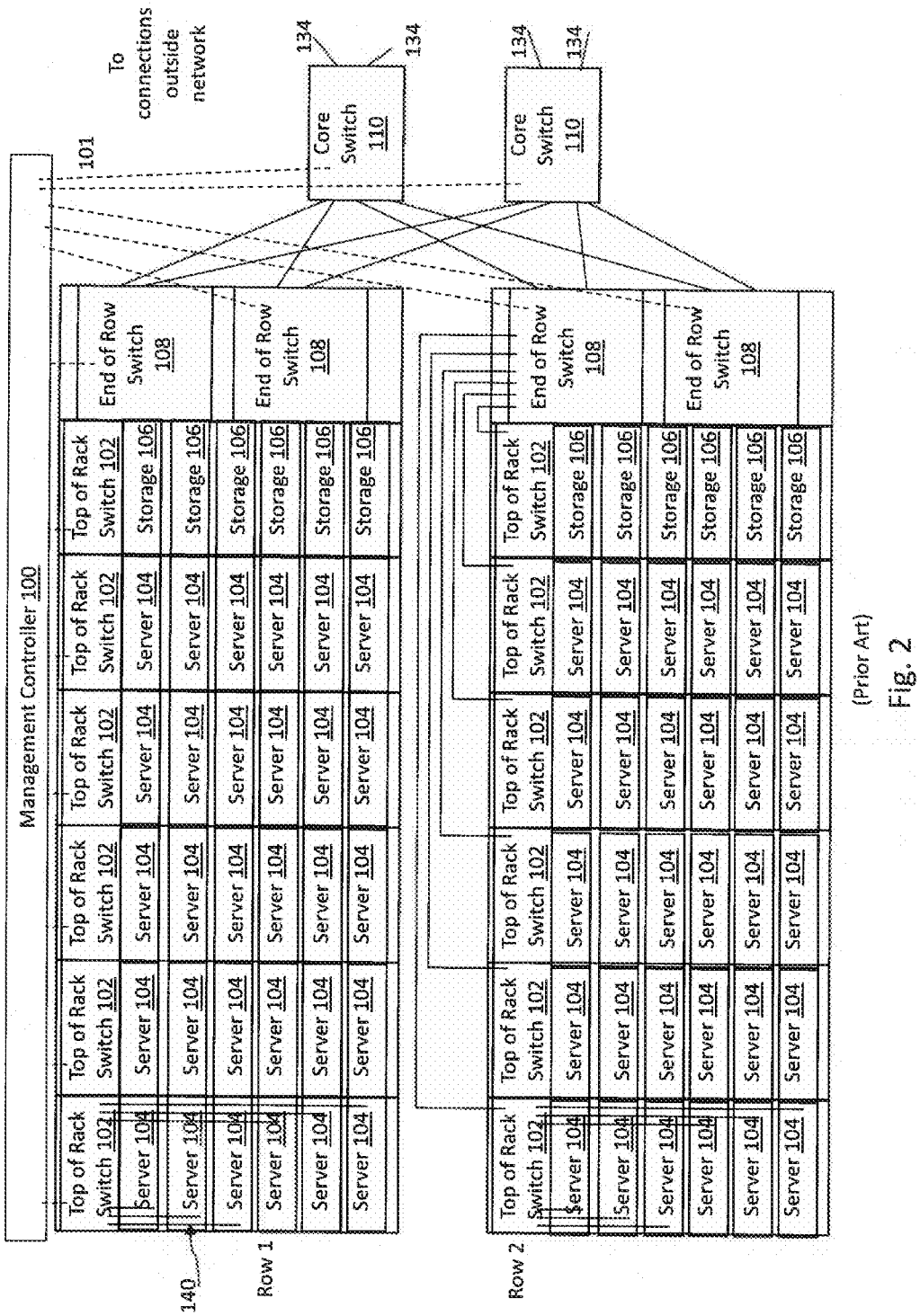
FIG. 2 is a block diagram of a row architecture in a conventional data center network.
Figure 3:
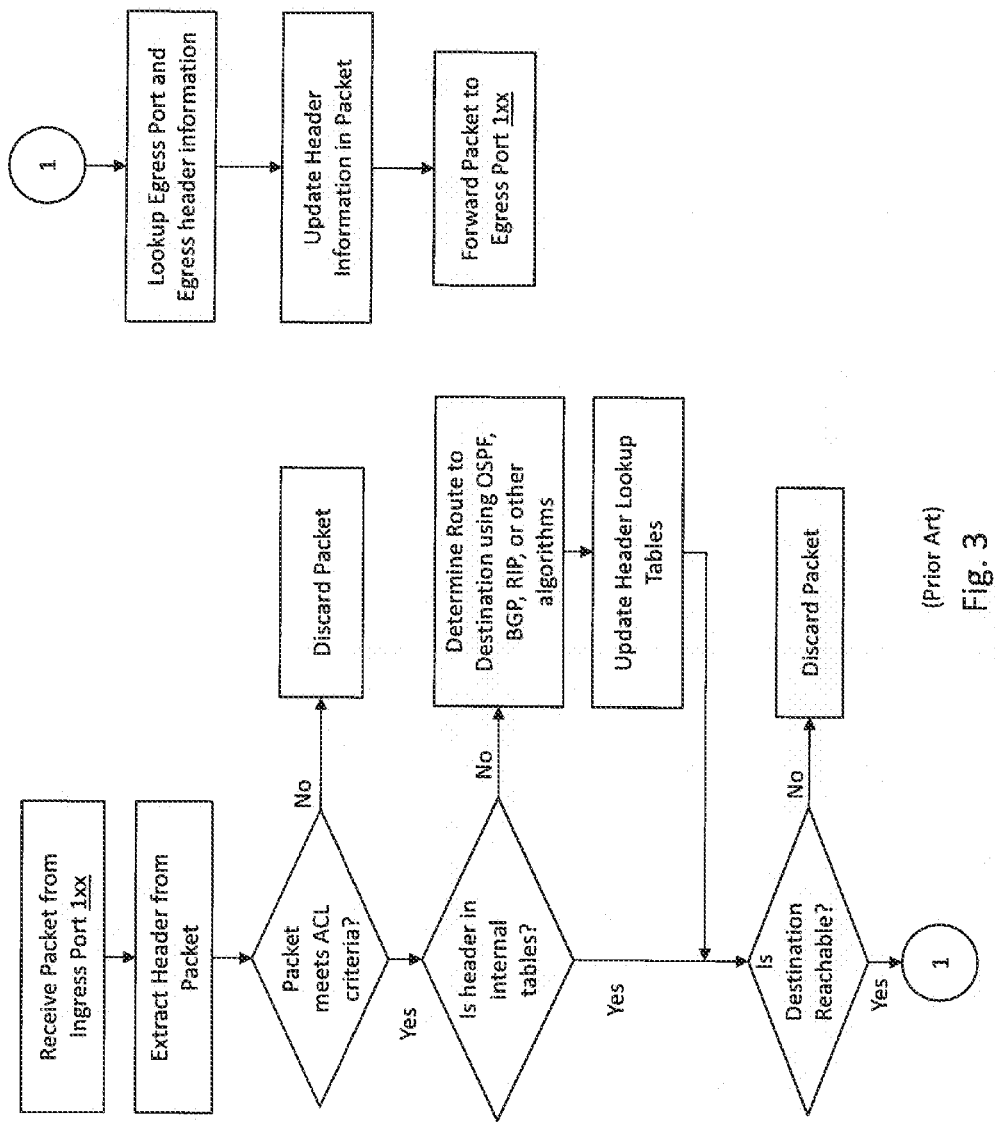
FIG. 3 is a flow diagram for a top of rack switch in a conventional data center network.
Figure 4:
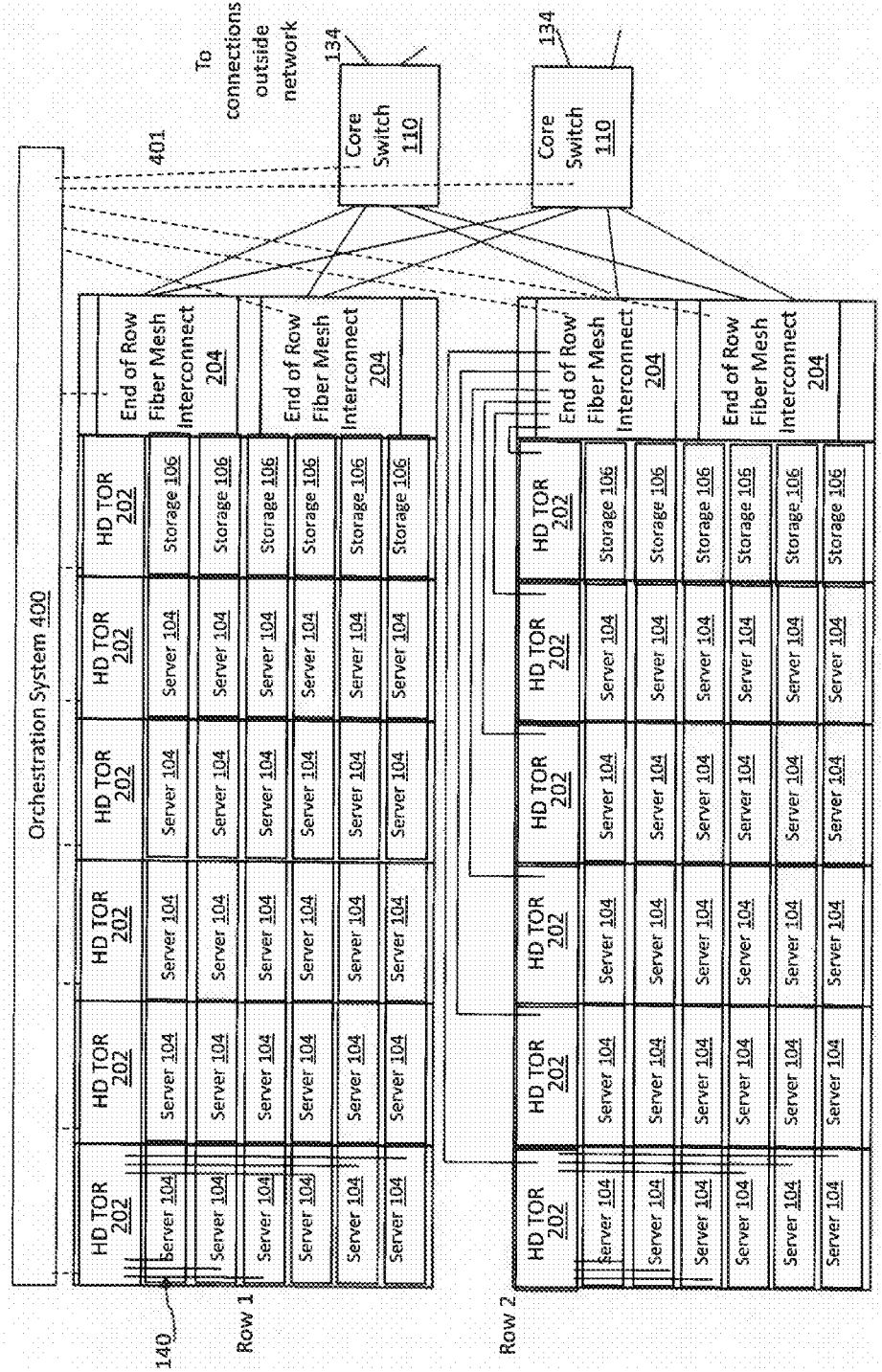
FIG. 4 is a block diagram of an embodiment of a row architecture in a data center network according to the present disclosure.

Referring now to FIG. 4, an embodiment of the data center network architecture according to the present application is shown. In this embodiment traditional TOR Switches 102 are replaced by a High Density Top of Rack (HD TOR) Switches 202 and the EOR switch 108 is replaced by with an End of Row Fiber Mesh Interconnect 204. In this configuration, the HD TOR Switch 202 has sufficient ports to connect to each of the other racks within the row or to the core switch 110 by interconnections established by the End of Row Fiber Mesh Interconnect 204.

Figure 5:
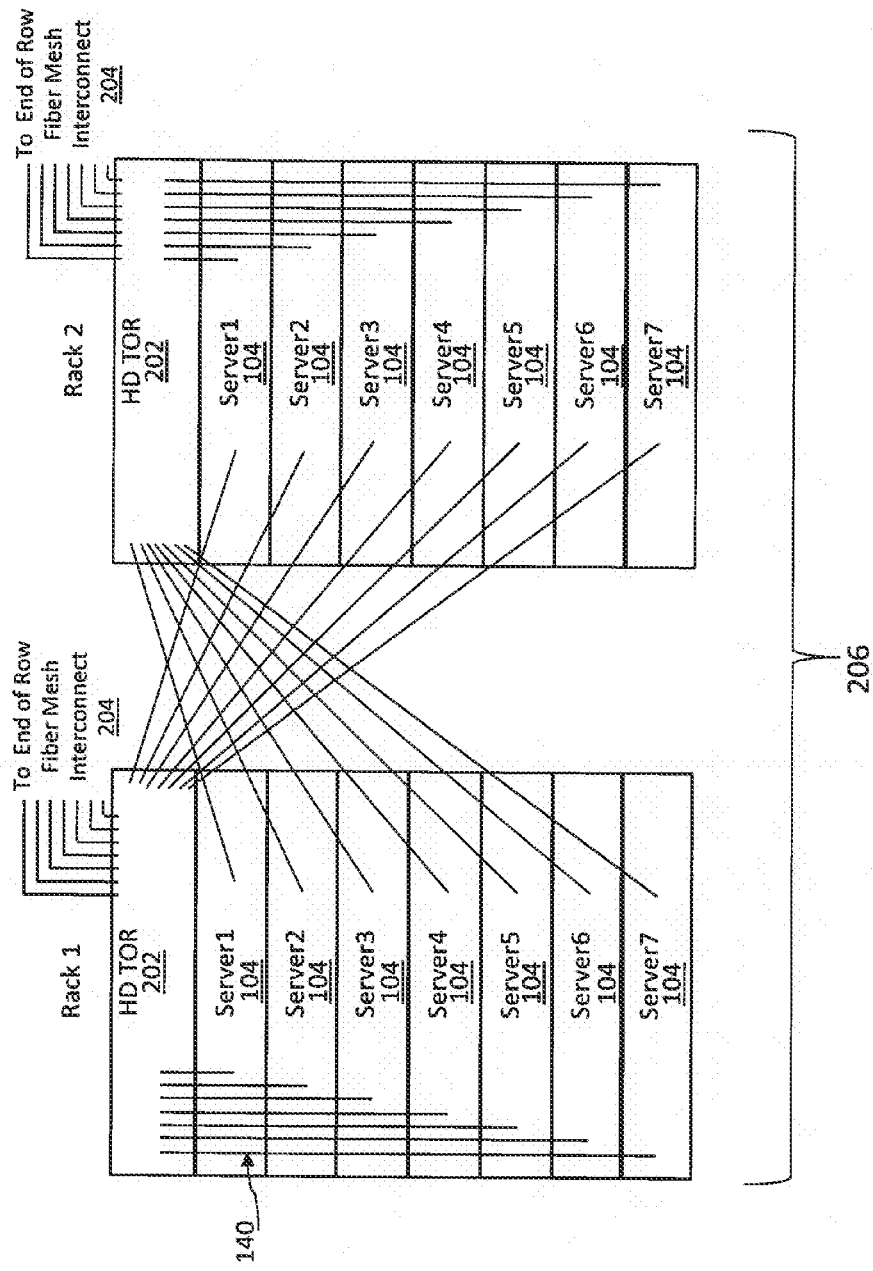
FIG. 5 is a block diagram of an embodiment of the interconnection between high density racks in the data center network according to the present disclosure.

In the embodiment of the FIG. 4 row 1 has six racks with a HD TOR switch 202. FIG. 5 shows an embodiment of two of the racks in a row, where the two racks are coupled together to create a double wide rack 206 configured as an odd and even rack. In this embodiment, ports from HD TOR Switch 202 connect to the servers 104 and/or storage devices 106 in an even and an odd rack, e.g., Rack 1 and Rack 2. In one implementation of this embodiment, a 128 port HD TOR switch 202 in each double wide rack 206 can provide 42 ports to network devices (e.g., servers 104, storage devices 106, and other network devices) contained in the odd rack (Rack 1) and 42 ports to network devices (e.g., servers 104, storage devices 106, and other network devices) contained in the even rack (Rack 2) for a total of 84 ports to the double wide rack 206. In this exemplary embodiment, each HD TOR switch 202 can have 4 ports connected to each of the other adjacent double racks, such that in a 12 rack row configuration a total of 20 ports are allocated. This leaves 24 ports to the EOR fiber core, e.g., fiber mesh interconnect 204. The actual implementation arrangement may be different for different data center configurations depending upon for example the size of the data center, type of traffic, the traffic models, requirements for inter server communications, and other attributes. As the number of ports on the HD TOR switches increases, this embodiment can support more ports per device, more devices per rack, or more racks per HD TOR Switch 202.

An alternate embodiment may include a double height single rack configuration in locations where vertical height for taller racks is not a concern.

Figure 6:
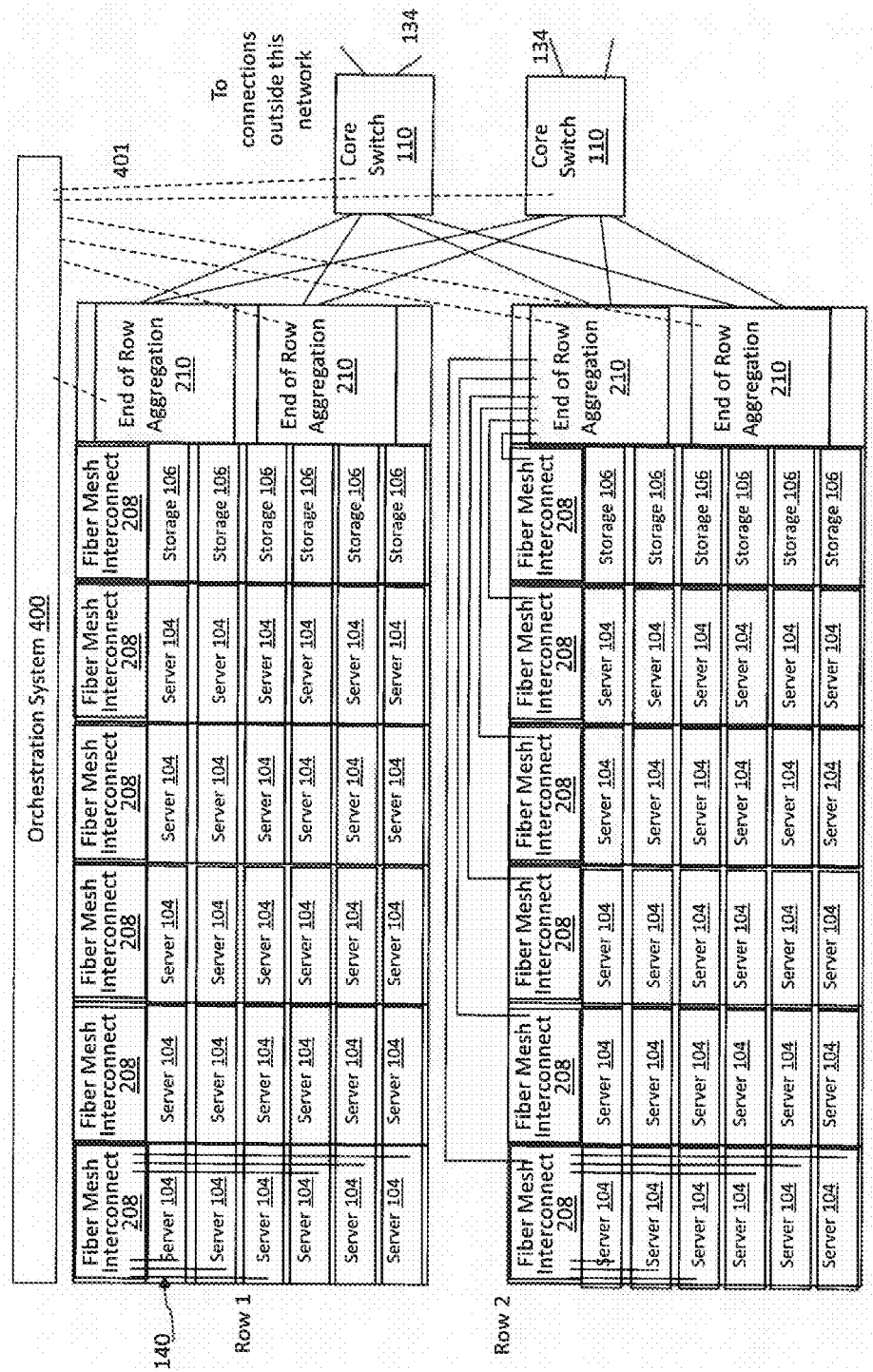
FIG. 6 is a block diagram of another embodiment of a row architecture in a data center network according to the present disclosure.

The embodiment in FIG. 6 shows a different implementation where conventional End of Row Switches 108 are replaced with End of Row Aggregation 210, and where conventional Top of Rack Switches 102 are replaced by TOR Fiber Mesh Interconnects 208. The TOR Fiber Mesh Interconnects 208 are passive optical interconnects that employ a fiber mesh structure (an example is seen in FIGS. 12-17) to connect all the network devices (e.g., servers 104, storage devices 106, and other network devices) in a rack to the End of Row Aggregation 210, thus eliminating the need for more costly Top of Rack Switches 102. The End of Row Aggregation 210 is different from the End of Row Switches 108 in that they are designed to function with the Fiber Mesh Interconnects 10.

Figure 7:
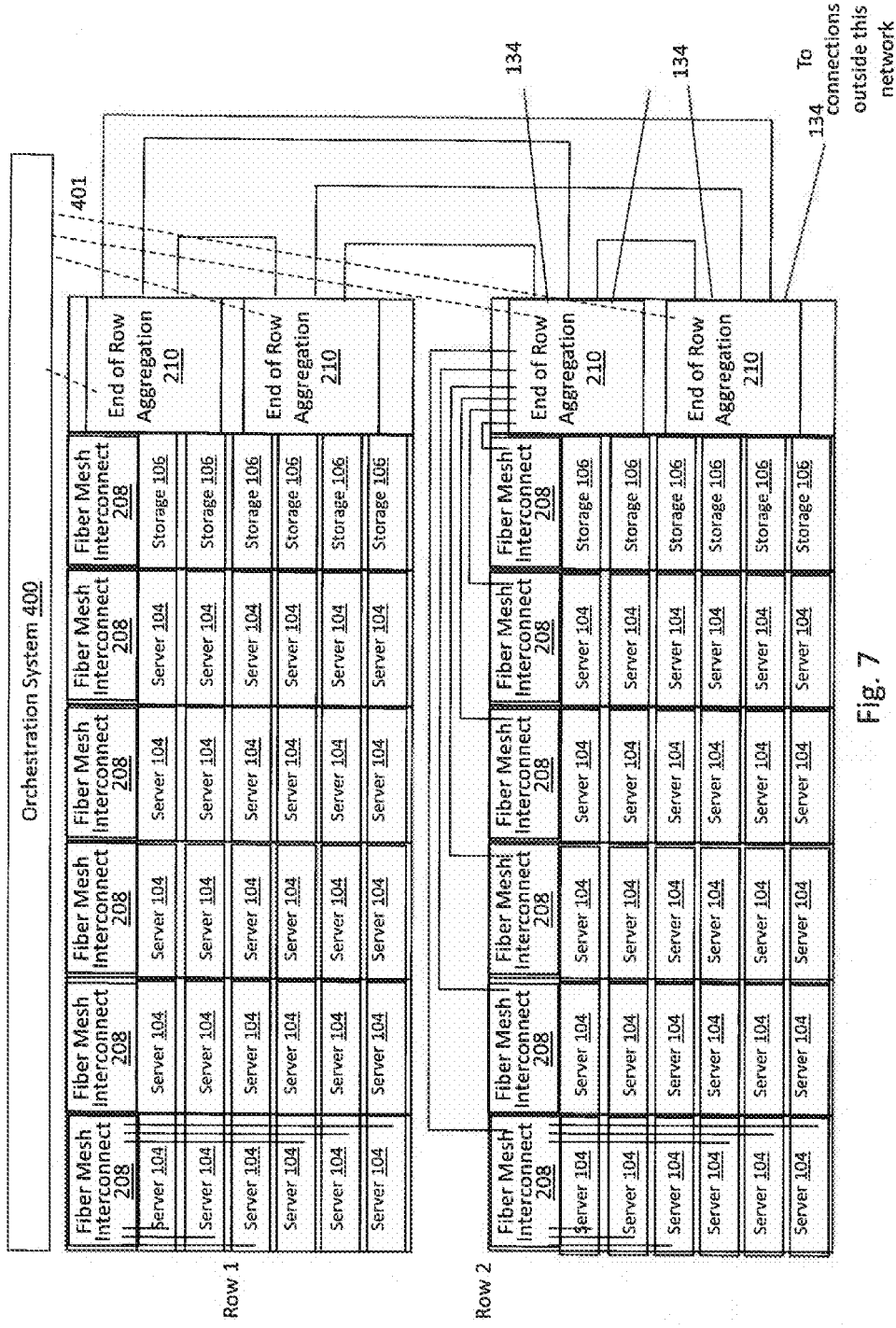
FIG. 7 is a block diagram of another embodiment of a row architecture in a data center network according to the present disclosure.

The embodiment in FIG. 7 shows a data center network that is similar to the embodiment of FIG. 6. In this embodiment, the Core Switches 110 are replaced by providing interconnections from the End of Row Aggregation 210 in one row to End of Row Aggregations 210 in other rows. Similarly, in the configuration in FIG. 4 the Core Switches 110 can be eliminated and the EOR fiber mesh interconnects 204 can provide the interconnections.

Figure 8:
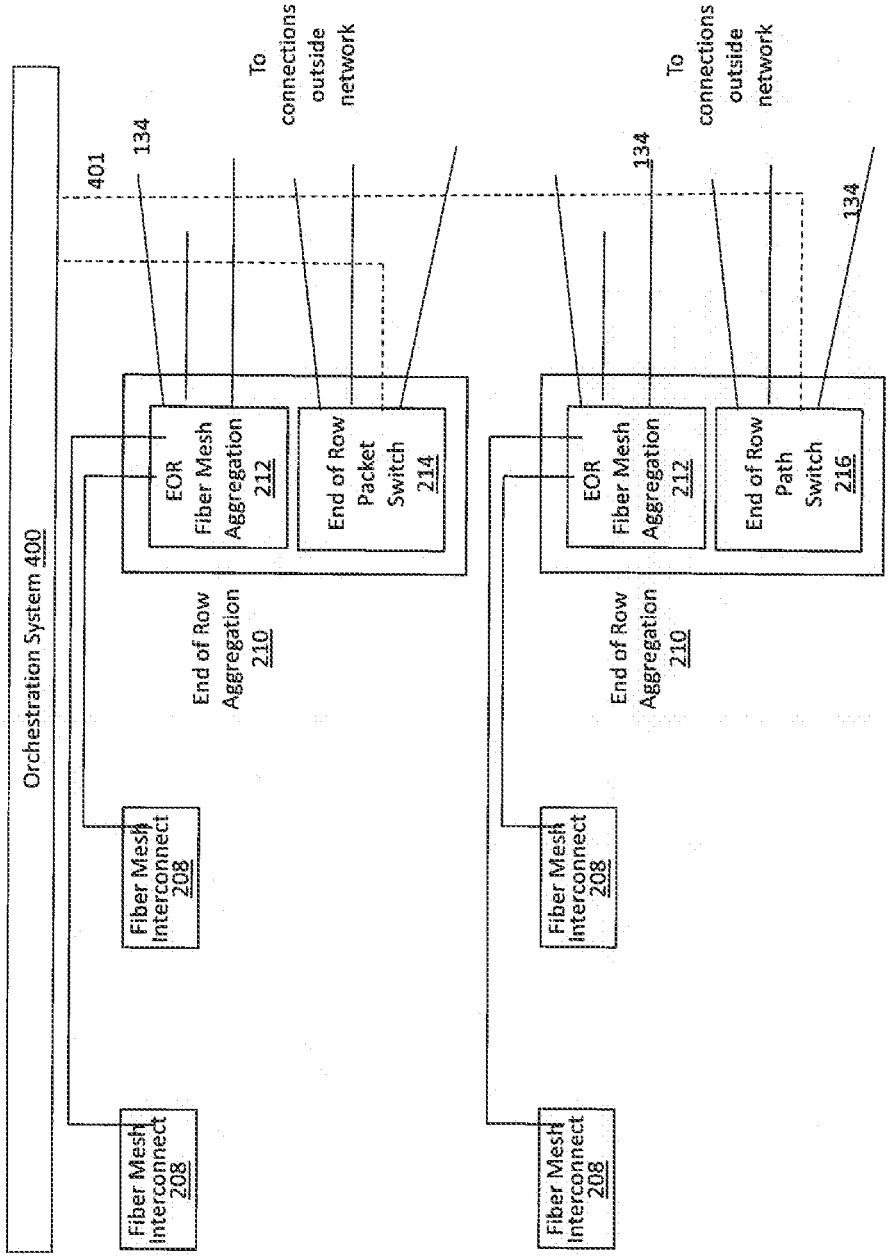
FIG. 8 is a block diagram of another embodiment of a row architecture in a data center network according to the present disclosure.

Referring to FIG. 8, The EOR Aggregation 210 can be implemented in a number of different configurations depending upon particular data center network architecture requirements. In certain embodiments, at least some of the fibers from each TOR Fiber Mesh Interconnect 208 are looped back in the EOR Fiber Mesh Aggregation 212 to other TOR Fiber Mesh Interconnects 208 in other racks, and to different fiber locations on the originating TOR Fiber Mesh Interconnect 208. This permits direct connections from one rack network device to connect directly with another network device located in the same or different rack and avoid the latency associated with being switched by a conventional TOR switch or EOR switch.

In another embodiment, the connections are fixed and the EOR Aggregation 210 may include EOR Fiber Mesh Aggregation 212. In this embodiment, fibers from the TOR Fiber Mesh Interconnects 208 would be looped to a destination either within the rack fiber interconnections or to connections outside the data center via connection 134 either to another row, or to a core switch for further switching. This also allows a core switch to provide switching functions if needed to selectively switch packets or paths back into the same row without the need for switching within the row.

In another embodiment, some of the fibers from the EOR Fiber Mesh Aggregation 212 may be fed to an End of Row Packet Switch 214 which would switch the individual packets based upon packet header destination information and based upon instructions from the orchestration system 400 which determines if the packets are to be sent back into the EOR Fiber Mesh Aggregation 212 for delivery to a device connected to a TOR Fiber Mesh Interconnect 208, or to an end location located outside the interconnections of the rack.

In another embodiment, some of the fibers from the TOR Fiber Mesh Interconnects 208 may be fed to an End of Row Path Switch 216 which would switch the entire optical signal from an input fiber to one or more outgoing fibers based upon instructions from the orchestration system 400. The optical path is then connected by the End of Row Path Switch 216 to an EOR Fiber Mesh Aggregation 212 or to an end location located outside the interconnections of the rack. The advantage of using path switches over packet switches is that a path switch has significantly less latency in the path because the entire path is switched and the circuitry inside the path switch does not look at the headers of each packet to make a decision as to where to switch the traffic. The advantage of using a packet switch over a path switch is that packet switches look at the headers of each packet to make a decision as to where to switch the data packet traffic and can switch individual packets to different destinations.

In another embodiment, some of the fibers from the TOR Fiber Mesh Interconnect 208 or EOR Fiber Mesh Interconnect 204 or EOR Fiber Mesh Aggregation 212 may be fed to an End of Row Packet Switch 214 while others are fed to an End of Row Path Switch 216. This permits the flexibility of packet switching for some connections as well as path switching for other connections under the configuration of the orchestration system 400.

An alternate embodiment for any of the previously mentioned or other configurations may include a middle rack for concentration of the fiber interconnections.

Figure 9:
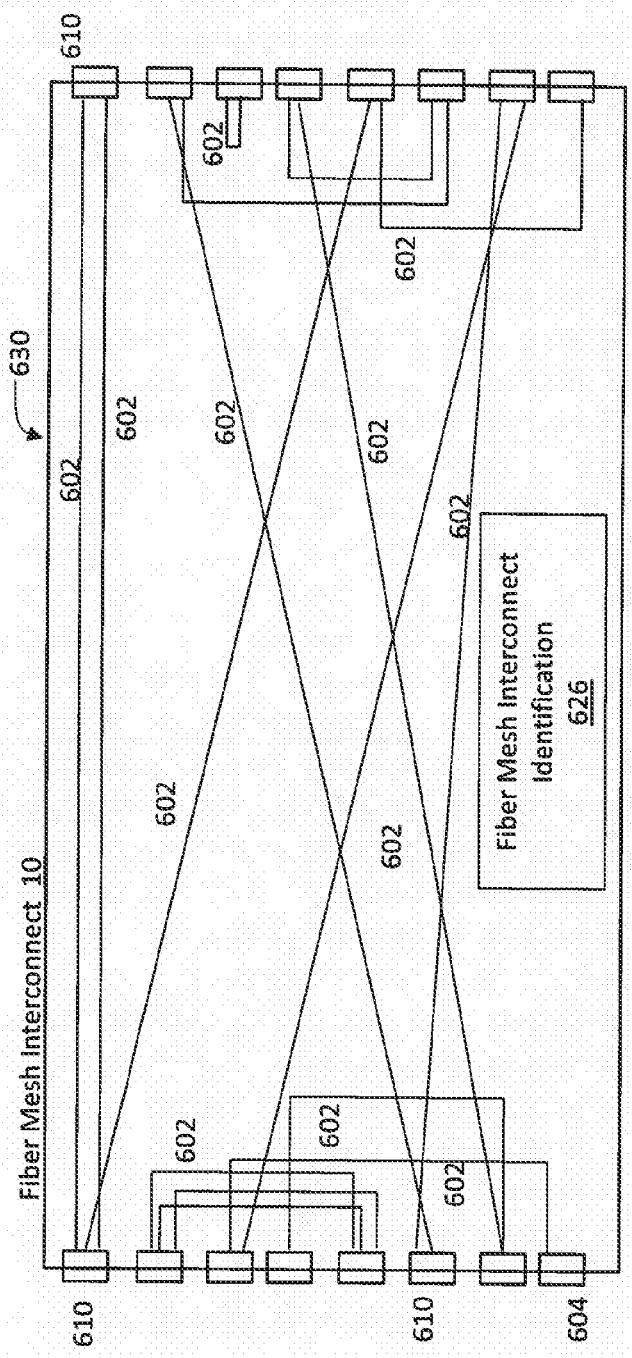
FIG. 9 is a block diagram of embodiments of a fiber mesh interconnect architecture according to the present disclosure.
Figure 10:
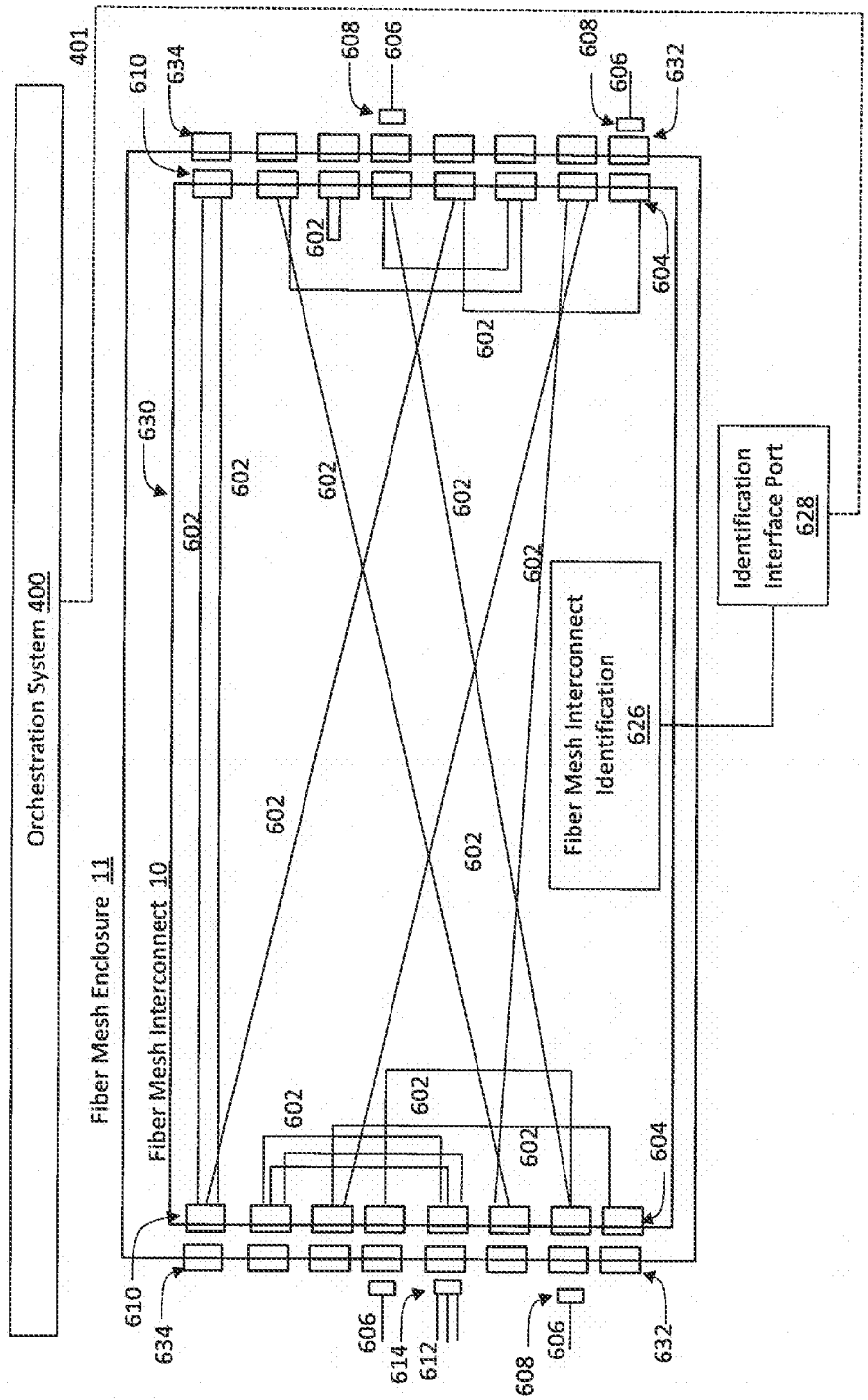
FIG. 10 is block diagram of another embodiment of a fiber mesh interconnect architecture according to the present disclosure.
Figure 19:
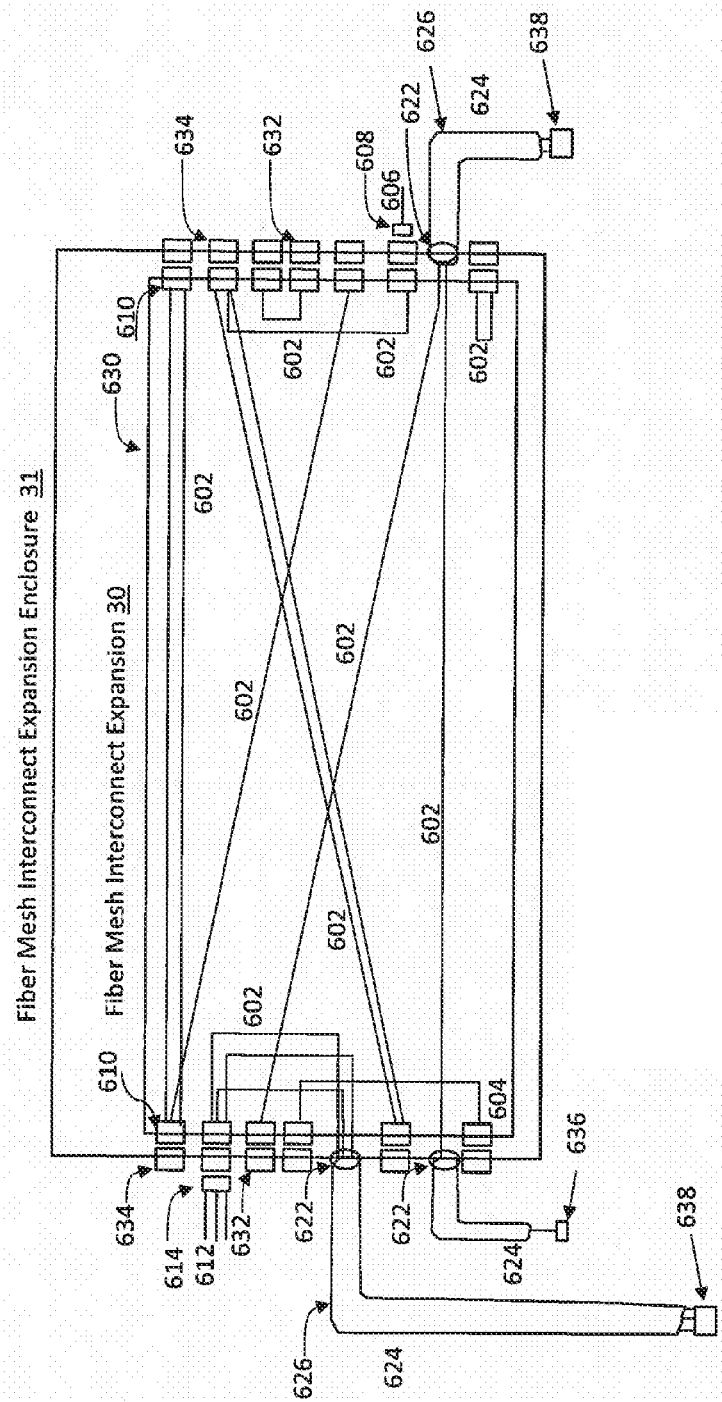
FIG. 19 is block diagram of another embodiment of a fiber mesh interconnect architecture according to the present disclosure.

Referring to FIG. 9, each of the TOR Fiber Mesh Interconnect 208, End of Row Fiber Mesh Interconnect 204, and EOR Fiber Mesh Aggregation 212 can also be referred to herein as a Fiber Mesh Interconnect 10. A Fiber Mesh Interconnect 10 is a system that simplifies the interconnection of fiber cabling within a data center network by increasing the fiber density within a small footprint. In one embodiment, the Fiber Mesh Interconnect 10 includes a plurality of individual fiber strands on one or more thin films, such as a Mylar sheet or other suitable medium, and a plurality of connectors 610 connected to one or more of the individual fiber strands. The Fiber Mesh Interconnect 10 may then be installed in a housing or enclosure to protect the fibers, as seen in FIGS. 10 and 19. Thus, the Fiber Mesh Interconnect 10 connects individual optical fiber strands from one port to a different port within the Fiber Mesh Interconnect 10.

Continuing to refer to FIG. 9, this embodiment uses a Fiber Mesh Interconnect 10 where bare or coated single-mode or multi-mode fibers are placed on a thin film surface 630, such as a Mylar sheet, in order to tightly control the route each fiber will take within the enclosure. The fibers are placed and then adhered to a thin film 630. The fibers can be in a single layer or can be overlapping previously laid fibers thus creating a multi-layer Fiber Mesh Interconnect 10. The connectors 610 are installed on to the fibers and then polished using standard fiber termination processes, or spliced to the fibers by fusion splicing or by another suitable method for terminating fibers to connectors. The Fiber Mesh Interconnect 10 is then placed in a housing or enclosure, as shown in FIG. 10. This architecture ensures each connection path within the Fiber Mesh Interconnect 10 is defined and routed in accordance to the intended routing path for that Fiber Mesh Interconnect 10 application.

One of the issues with using individual fiber cables with connectors is that the cables are be placed inside the enclosure in such a manner that the cables do not fold or bend below the minimum bend radius recommended for that fiber type. Bending a fiber cable below its minimum bend radius results in optical power loss and potentially signal loss. This present disclosure contemplates adhering fibers to a horizontal plane, e.g., the thin film 630, from one connector position to another connector position such that the route and the fiber bend radius is tightly controlled thus minimizing optical power or signal loss. Using the thin film architecture described above, permits selective positioning of fibers in tight spaces and around objects or obstacles without optical power loss or signal loss. By having the bare or coated fibers placed on a thin film surface, it is also possible for the fiber connections to pass in the thin space between the bottom of printed circuit boards top surface of a metal enclosure.

In instances where there are restrictions on actual placement of fibers due to obstructions and other physical issues, placing fibers on a thin film 630 permits the route for each individual fiber and for the surface itself to be controlled so as to avoid obstacles, such as cutouts, screw mountings, support posts, low components, tall components, and other obstructions. The fibers can be routed around these obstacles in order to meet the bend radiuses and provide the connections between any two endpoints.

In another embodiment, the Fiber Mesh Interconnect 10 uses bare or coated fibers on a thin film 630 where the fibers can be physically mated to the FC, SC, ST, LC, MPO, MXC, or other connectors intended for the inside of the front or rear connector locations. These connectors can be terminated, fusion spliced, or can be mated using other termination process.

This method also permits increased fiber density in the area between the front and rear connectors permitting additional connectors and connectors with larger fiber counts on both the front and rear panels.

In another embodiment, the use of the Fiber Mesh Interconnect 10 can reduce the depth for an enclosure using standard cabling solutions.

In some applications of multifiber connections, the actual path length is important to ensure that one signal does not arrive before or after another signal in the same multifiber group. These are typically bonded signal applications where the path length should be tightly matched. In this particular case, the individual fibers can be routed from one connector to another such that each fiber in the same multifiber group has the same fiber length regardless of the actual distance between the ingress connector position and the egress connector position. For example, in one multifiber application, a path might be from one connector on the far left side of a panel to a connector on the far right side of the panel. At the same time a loopback connection may be from one position to another position on the same multifiber connector. This would normally be either a very short loopback connection or a large fiber route inside the enclosure which would occupy considerable space and may bunch up fibers inside the enclosure potentially resulting in bend radius issues. By using the Fiber Mesh Interconnect 10 of the present application, fibers adhered to the substrate can result in a controlled length, controlled bend radius, and fixed fiber routing path in order to control the variability within fiber placement.

The Fiber Mesh Interconnect 10 of the present disclosure permits the creation of a fiber interconnect scheme between a plurality of fiber optic ports. In some embodiments, bundled fibers in various configurations including ribbon fibers can be used in the Fiber Mesh Interconnect 10. The individual or bundled fibers are adhered to a thin film, e.g., a Mylar sheet, using adhesives or other method to secure the fiber in place.

FIGS. 9 and 10 show one embodiment of a Fiber Mesh Interconnect 10 where ports or connectors 604 and 610 are interconnected by fibers 602 to provide an interconnection between the plurality of fiber ports (or connectors) 604 and 610. The fibers are terminated within the Fiber Mesh Interconnect 10 by either single or duplex fiber connectors 604, such as FC, SC, ST, LC, or other single or duplex fiber optic connectors, or by multifiber connectors 610, such as MPO and MXC connectors. A single fiber connector 604 mates with an external equivalent connector type 608 carrying a single or duplex fiber cable 606. Multifiber connectors 610 mate with multifiber cables 612 terminated into multifiber connectors 614.

In one embodiment, individual fiber optic fibers terminated using FC, SC, ST, LC, MPO, MXC, or other fiber optic connectors 604 and 610 can be connected individually from point to point for each endpoint. In this case, the cross mapping of the endpoints is implemented on a per endpoint basis.

Another embodiment permits fiber optic cables using single fiber connectors 604 which connect to single fiber cables 606 terminated in single fiber connectors 608 such as FC, SC, ST, LC, or other single fiber optic connectors to connect to an interconnect panel, which in turn provides the cross mapping in order to connect one end point to a different endpoint. This exemplary embodiment further simplifies the architecture since rather than have multiple individual cables, the interconnect panel can support the cross mapping and use standard installation cables in the data center network.

In another embodiment, predefined fiber cable bundles comprising multiple fiber paths 602 can be constructed using the thin film 630 connecting to connectors 604 and 610 using terminated FC, SC, ST, LC, MPO, MXC, or other fiber optic connectors 608 and 614 at the cable ends with the cross mapping of the configurations of the network devices in a local interconnection scheme designed into the cable bundle. In this case, the interconnection scheme is simplified for the installer and reduces the possibility or cross mapping errors.

The individual ports can be FC, SC, ST, LC, MPO, MXC, or other types of fiber optic connector 604 and 610. Thus, the Fiber Mesh Interconnect 10 may be able to convert from one fiber connector type to another connector type, so that the different fiber connector types may be mixed within the same system. In the case of multiple stranded fiber connectors, such as MPO connectors 614, where a designated fiber is identified by its position within the connector, the fiber mapping may be from one position within the MPO to an identical position in a different MPO. In another variant, the fiber mapping may be from one position within the MPO to a different position in a different MPO. In another variant, the fiber mapping may be from one position within the MPO to a different position within the same MPO. In another variant, the fiber mapping may be from one position within the MPO to a different position in a different connector type, such as an FC, SC, ST, LC, MXC or other types of fiber optic connectors 608 and 614.

The individual fibers are placed onto the Mylar or other substrate surface either in groups or individually to create connections from one fiber endpoint position to a different fiber endpoint position. Individual fibers can be placed on a single row or layered over other fibers such that the fiber mesh architecture becomes a three dimensional stack of fibers. The individual fibers are then terminated onto an FC, SC, ST, LC, MPO, MXC, or other fiber connector types 608 and 614 as noted above. Multi-position fibers such as MPO or MXC connectors 614, may have the individual fibers grouped and packed in ribbon strips for end terminations. The resulting arrangement produces a row of fiber optic connectors interconnected by individual fiber strands to form the Fiber Mesh Interconnect 10. As noted above, the Fiber Mesh Interconnect 10 may be installed within a housing or enclosure, and in such configurations, the connectors 604 and 610 could be arranged on a front, rear or side panel of the housing or enclosure. In one embodiment, the fiber optic connectors can all be arranged on the front panel. In another embodiment, the fiber optic connectors can all be arranged on the rear panel. In another embodiment, the fiber optic connectors can be arranged with some connectors on the front panel and some connectors on the rear panel. Likewise, there are applications where certain connectors might be mounted on the top, bottom, or sides of the housing or enclosure.

In yet another embodiment, the connectors can be arranged in a vertical arrangement, such that the configuration results in a stacked set of fiber optic connectors. Similarly, fiber connectors may exit the enclosure from any side of the enclosure depending upon the particular implementation needed.

As noted, the Fiber Mesh Interconnect 10 may be positioned in a housing or enclosure with the fiber optic connectors on the outside of the housing or enclosure. In such configurations, individual fiber connections on the outside of the housing or enclosure have a dedicated route to another individual fiber connection. In this way, specific interconnect and cross-connect patterns can be created within the enclosure and thus permitting the use of common off the shelf trunk cables and patch cables between one network device and another network device or to multiple network devices in the case of multifiber cabling.

FIG. 10 shows one embodiment of a fiber mesh interconnect 10 housed in a fiber mesh enclosure 11. Fiber mesh connectors 604 and 610 are coupled to external cable connectors 608 and 612 by fiber couplers 632 and 634. Fiber mesh connectors 604, external cable connectors 608, and fiber couplers 632 can be the type of single fiber connector type FC, SC, ST, LC or other single or duplex fiber type. Fiber mesh connector 610, external cable connectors 612 and fiber couplers 634 can be the type of multifiber connector type MPO, MXC, or other multi-fiber type.

The Fiber Mesh Interconnect 10 can include many variations. As defined above, the implementation may be straight through from input port to output port utilizing either the same or different connector types and or connector sizes, or may have different input port to output port connectivity.

In one embodiment, a Fiber Mesh Interconnect 10 can provide all the primary path connections within a data center network. In another embodiment, a Fiber Mesh Interconnect 10 provides the primary and alternate path connections in a data center network. In a different embodiment, a number of Fiber Mesh Interconnects 10 can coexist and or interconnect to one another in the data center network.

It is also contemplated that a plurality of Fiber Mesh Interconnects 10 may be in a single housing or enclosure, such that the connectors are accessible through a one or more enclosure panels. In another embodiment, the plurality of Fiber Mesh Interconnects 10 within the enclosure may have connections from the different interconnects mixed together on multiple enclosure panels.

In another embodiment, the plurality of Fiber Mesh Interconnects 10 within the enclosure may have connections mated internally from one Fiber Mesh Interconnect 10 to another Fiber Mesh Interconnect 10.

In yet another embodiment, the plurality of Fiber Mesh Interconnects 10 within the enclosure may be switchable from Fiber Mesh Interconnect 10 to a different Fiber Mesh Interconnect 10 in order to switch network configurations. In this instance, a one enclosure with multiple Fiber Mesh Interconnect 10 panels, a mechanical or mechanized lever may remove one Fiber Mesh Interconnect 10 panel from the inside of the external connector ports and insert another Fiber Mesh Interconnect 10 panel into the inside of the external connector ports. This permits reconfiguration of the fiber mesh network without re-cabling the external connections.

In another embodiment, an enclosure with multiple Fiber Mesh Interconnects 10 may have the connections brought out from a single interconnect and a motor may, under the control of a controller, move one Fiber Mesh Interconnect 10 enclosure from the internal connectors and insert another Fiber Mesh Interconnect 10 enclosure into the internal connectors of the second Fiber Mesh Interconnect 10.

The Fiber Mesh Interconnect 10 can have many different implementations depending upon the network size and topology. In one embodiment, the Fiber Mesh Interconnects 10 can be placed on a hot insertable blade, which can be swapped in the field. In another application, the Fiber Mesh Interconnect 10 can be swapped in the field by replacing a damaged interconnect substrate with a working interconnect substrate. In another example, one Fiber Mesh Interconnect 10 implementation can be swapped for a different Fiber Mesh Interconnect 10 wiring configuration.

Continuing to refer to FIG. 10, to take advantage of the many implementations of the Fiber Mesh Interconnect 10, each Fiber Mesh Interconnect 10 is associated with a unique identifier in a given network, and each physical port (or connector) and each fiber strand is associated with a unique configuration implementation for that particular Fiber Mesh Interconnect 10. The orchestration system 400 can discover these identifiers during a discovery cycle. The information discovered by the orchestration system 400 includes the part number, fiber mesh configuration number, serial number, date of manufacture, and other relevant information. Interconnection information regarding fiber connector types, fiber types and other information may be included from the Fiber Mesh Interconnect 10 itself or may be obtained by looking up the information in an external database.

Techniques exist for identifying printed wiring boards and cables by software capable reading a defined hardware object on the application which may include patterns of readable lines (bar codes), resistor values and positions to identify unique readable numbers, software readable registers or other mechanisms capable of holding unique information. The Fiber Mesh Interconnect 10 can be equipped with one of these methods such that it is discoverable and readable by the orchestrations system 400.

The Fiber Mesh Interconnect Information 626 can be also implemented in a variety of different concepts such as printed on a bar code or data code, such as a QR code and read by a bar code reader, QR scanner or other equivalent device. In a different embodiment, the Fiber Mesh Interconnect Information 626 could be stored in an electronic memory circuit such as a PROM, ROM, or register field, or other type of device which can be read by an identification interface 628, such as a serial port, USB port, Ethernet port, or other means to read the device and electronically pass the information read to a managing or monitoring entity.

The Fiber Mesh Interconnect Identification 626 information can be read by the orchestration system 400 through Identification Interface port 628. In another embodiment, the Fiber Mesh Interconnect 10 may have a Control Processor on the Fiber Mesh Enclosure 11 assembly which may read the Fiber Mesh Interconnect Information 626 and transmit it to orchestration system 400.

Figure 11:
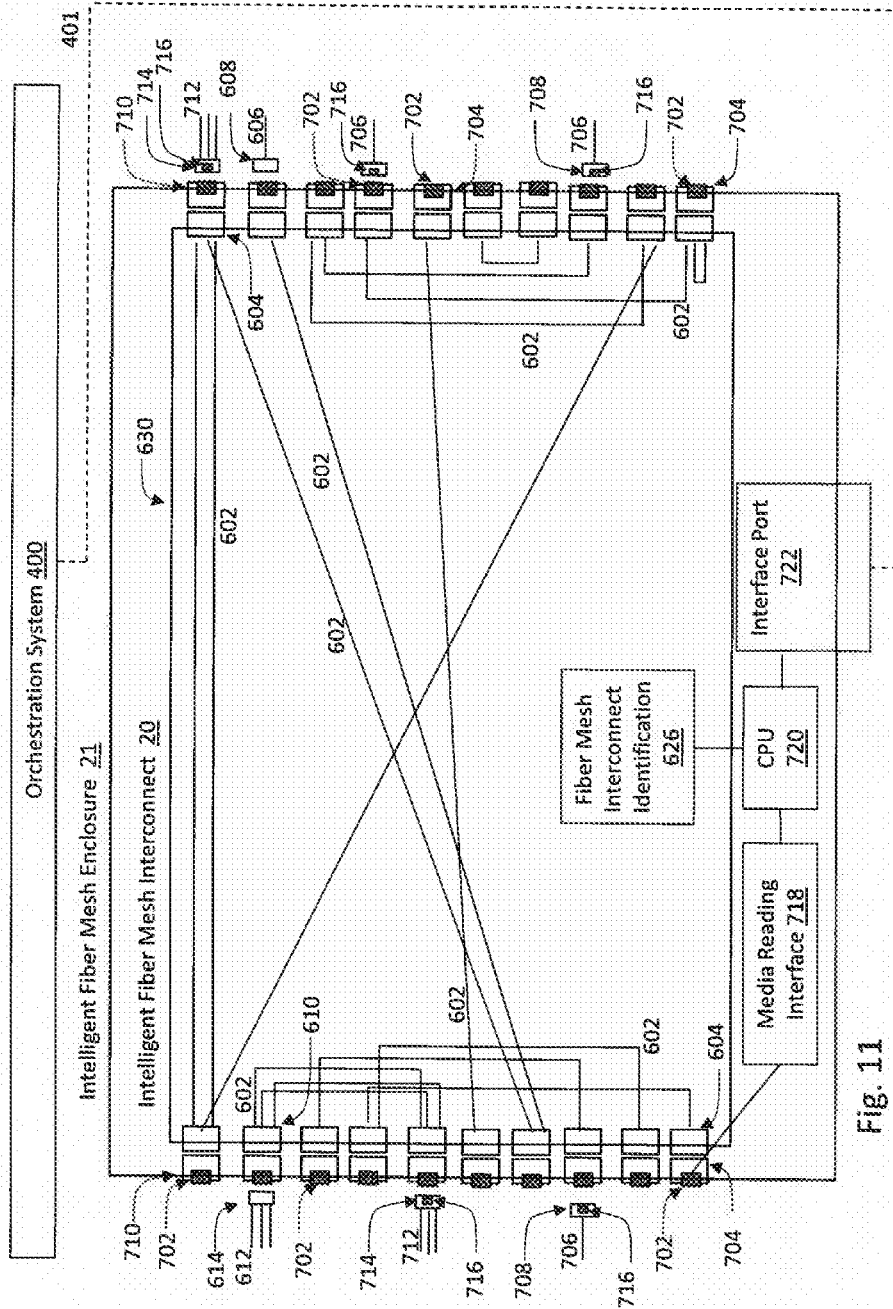
FIG. 11 is block diagram of another embodiment of a fiber mesh interconnect architecture according to the present disclosure.

FIG. 11 shows the addition of physical identification technologies, such as ninth wire technologies, RFID tagging, Connection Point Identification (CPID), and other technologies, on the Fiber Mesh Interconnect 10 couplers 704 and 710. Each Fiber Mesh Interconnect coupler 704 or 710 will have the capability to determine the cable presence and cable information available to Fiber Mesh Interconnect 10 depending upon the information provided from the intelligent cable. This information is collected by a Media Reading Interface 718 in Intelligent Fiber Mesh Enclosure 21 through intelligent media interface 702 and passed to the CPU 720. The CPU 720 then reports the information to the orchestration system 400 via Fiber Mesh Interconnect Port 722.

In one embodiment, the Fiber Mesh Interconnect 20 may be designed with ninth wire technologies interfaces. In another embodiment, the Fiber Mesh Interconnect 20 may be designed with RFID tagging technology interfaces. In another embodiment, the Fiber Mesh Interconnect 20 may be designed with CPID technology interfaces. In another embodiment, the Fiber Mesh Interconnect 20 may be designed with other managed cable intelligence technologies. In another embodiment, the Fiber Mesh Interconnect 20 may be designed with one or more of these different technology interfaces in order to provide the capabilities of supporting more than one particular managed intelligence technology in an application. This application may have the different technologies separate in the same assembly or may be used to bridge interfaces of different intelligence technologies to each other for example. This intelligent capability permits the orchestration system 400 to be able to identify each cable connection connected to the Fiber Mesh Interconnect 20. FIGS. 12-17 show an implementation according to the present disclosure of a TOR Fiber Mesh and an EOR Fiber Mesh.

Figure 18:
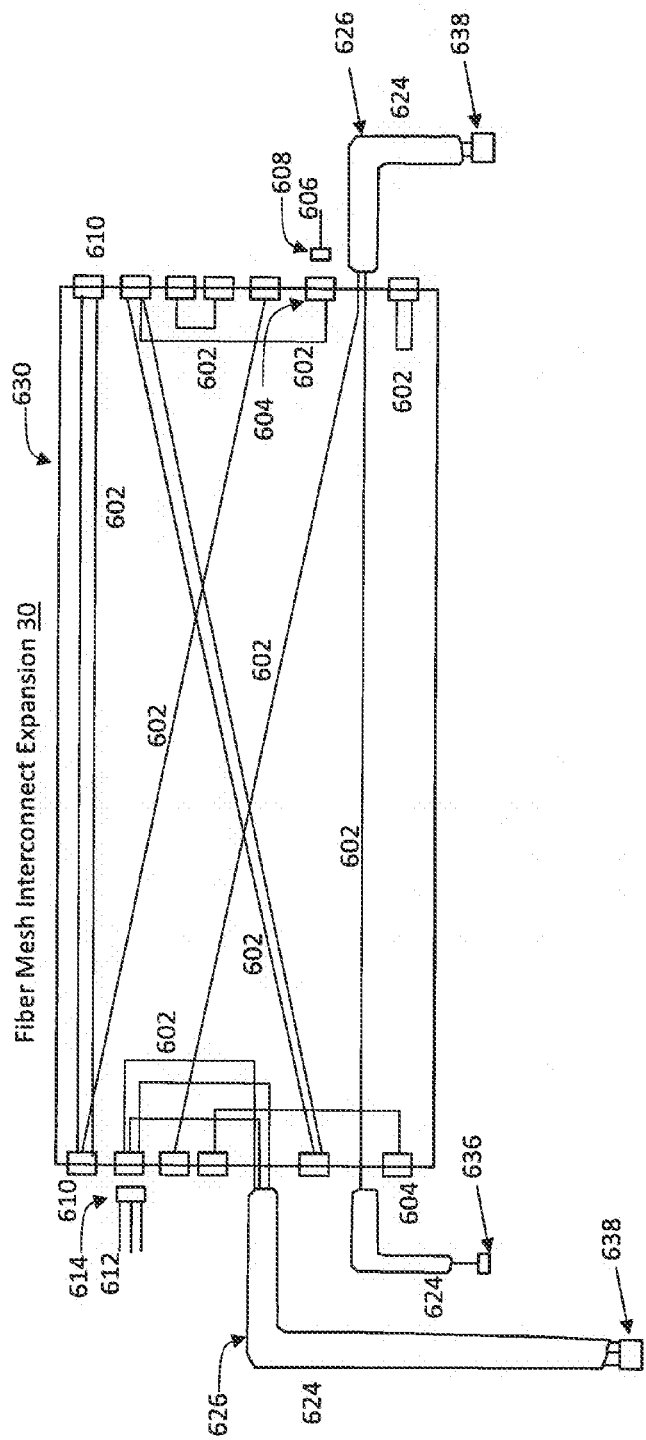
FIG. 18 is block diagram of another embodiment of a fiber mesh interconnect architecture according to the present disclosure.

Referring to FIG. 18, a Fiber Mesh Interconnect Expansion 30 according to the present disclosure simplifies the cabling within the data center network and reduces insertion loss associated with multiple connections by using extensions in the fiber mesh interconnect expansion 30 to provide dedicated connections directly to the devices.

As noted above, a Fiber Mesh Interconnect 10 terminates all the fibers on the Fiber Mesh Interconnect 10 into single fiber connectors 604 or multifiber connectors 610. A fiber patch cable then connects the Fiber Mesh Interconnect 10 from connector 604 or 610 to a network device, e.g., a server or storage device.

FIG. 18 shows one embodiment of the Fiber Mesh Interconnect Expansion 30, which is similar to the Fiber Mesh Interconnect 10 of FIG. 9, but also includes Fiber Mesh Expansion cables 624. Each Fiber Mesh Expansion cable 624 extends off the edge of Fiber Mesh Interconnect 30. The Fiber Mesh Expansion is made by placing fibers 602 on the thin film substrate from one connector 604, 610, 608, 612 to another connector 604, 610, 608, 612. In the Fiber Mesh Interconnect Expansion 30, the Fiber Mesh Expansion cables 624 are placed in the same manner on the Fiber Mesh Interconnect 10 except that the fibers 602 extend off the thin film substrate outside the physical enclosure and are terminated in connectors 608 or 612 at some distance from the enclosure.

The fibers may be terminated to a connector 632 as a single fiber 602 or may be terminated in a connector 634 which can support multiple fibers 602.

The fibers 602 exiting the Fiber Mesh Interconnect Expansion 30 may also be encased in a sheathing 626 intended to protect the fibers from damage as they are routed to their intended destination.

In one embodiment as shown in FIG. 18, the Fiber Mesh Interconnect Expansion 30 may be implemented without an enclosure. In embodiment as shown in FIG. 19, the Fiber Mesh Interconnect Expansion 30 may be implemented within Fiber Mesh Interconnect Expansion Enclosure 31. The fiber extensions 624 exit the enclosure 31 through opening 622 which may or may not have some form of strain relief to anchor the fiber or to provide necessary strain relief against such hazards as minimum bend radius.

In one embodiment, all cables 624 from the enclosure 31 have the same fixed length. In another embodiment, cables 624 may have different lengths depending upon the application. In one embodiment, the Fiber Mesh Interconnect Expansion 30 is located at the top of a rack. In this embodiment the cables 624 are fed down the sides of the rack making connections to the servers, storage devices or both depending upon the implementation. In another embodiment, the Fiber Mesh Interconnect Expansion 30 may be located at the end of a row of cabinets and the cable extensions 624 fan out to each rack in a row.

Preferably, each fiber has a predetermined length based on a given network configuration and therefore, the Fiber Mesh Interconnect 10 can be made as a Fiber Mesh Expansion 30 with the internal fibers extended to the desired length and terminated at in factory. The completed Fiber Mesh Interconnect Expansion 30 assembly can then be installed at the customer with the cabling already routed in place.

The Fiber Mesh Interconnect Expansion 30 has individual cables 624 for the intended endpoints which can be terminated with different connectors 632 and 634 such as FC, SC, ST, LC, MPO, MXC, or other connector types depending upon the breakout requirement. The Fiber Mesh Interconnect Expansion cables 624 for the intended endpoints can also be terminated with intelligence cable connectors 708 and 714.

Similar to FIG. 11, the Fiber Mesh Interconnect Expansion connectors 636 and 638 can be implemented with intelligent connectivity such as ninth wire technologies, RFID tagging, Connection Point Identification (CPID), and other technologies.

Another embodiment of the data center network of the present disclosure is the provision of a network device that supports the collection of intelligent information from within the network device itself, thus improving the accuracy of the readings and permitting direct reporting of the physical cable information to the orchestration system 400.

Each network device can report to the orchestration system 400 the type of network device it is, e.g., a switch, server, storage device, interconnect panel, cross connect panel, along with relevant information for that network device, including number of ports, type of ports, speed of ports, and other physical information known to the network device. This information can be transmitted to the orchestration system 400.

Each network device also has a physical location within a data center such as in a particular rack in a particular row. This information is either programmed into the network device which can be transmitted to the orchestration system 400 or is entered directly into the orchestration system 400.

Another embodiment of the data center network of the present disclosure is the provision of an intelligent network device where managed intelligence connectors are incorporated into the intelligent network device. By implementing intelligent network devices in the data center network, the orchestration system 400 can collect not only the physical information of the intelligent network device, but also each intelligent network device can detect the insertion and removal of cables in the network device connectors and can collect cable parameter information of the cables connected to the intelligent network device. The intelligent network device can then report this information to the orchestration system 400, which can map out each connection in the network.

The cable information provided to the orchestration system 400 may include for each cable connection, the cable type, cable configuration, cable length, cable part number, cable serial number, and other information available to be read by the Media Reading Interface 702. This information is collected by the Media Reading Device 718 and passed to the CPU 720 which in turn forwards the information to orchestration system 400. With this information, the orchestration system 400 can identify each unique cable within the data center network and know the end physical locations (including the geographic location) of each cable end as reported by each network Pathway Controlling Device 130.

With this information, the orchestration system 400 can determine each segment connection of the cable connection. With this information, the orchestration system 400 can determine the end-to-end connectivity for every connection within the network.

For troubleshooting and maintenance, the orchestration system 400 can isolate connectivity down to a per port and per cable connector. With this information, the orchestration system 400 can identify which end of a cable has been disconnected in most segments.

Additionally, because the orchestration system 400 has the end-to-end connection information from the physical layer, Layer 2 protocols including STP, ARP, and other discovery protocols are not needed for determining interconnections within the data center network. Rather than the Pathway Controlling Devices 130 trying to determine their interconnections, the orchestration system 400 can instead map out the interconnections and program the routing tables into the Pathway Controlling Devices 130.

Additionally, with this information, the orchestration system 400 can make deterministic decisions on how to route traffic through the network. The path may be selectable by overall connection length, individual segment length, port speed, number of interconnections in a given path, physical security of a particular link, or other attributes that may determine particular path selection.

The orchestration system 400 has the capability to display this information in tabular, graphical, or other forms to a user.

The orchestration system 400 has the capability to collect and display information changes in real time as they occur.

Figure 20:
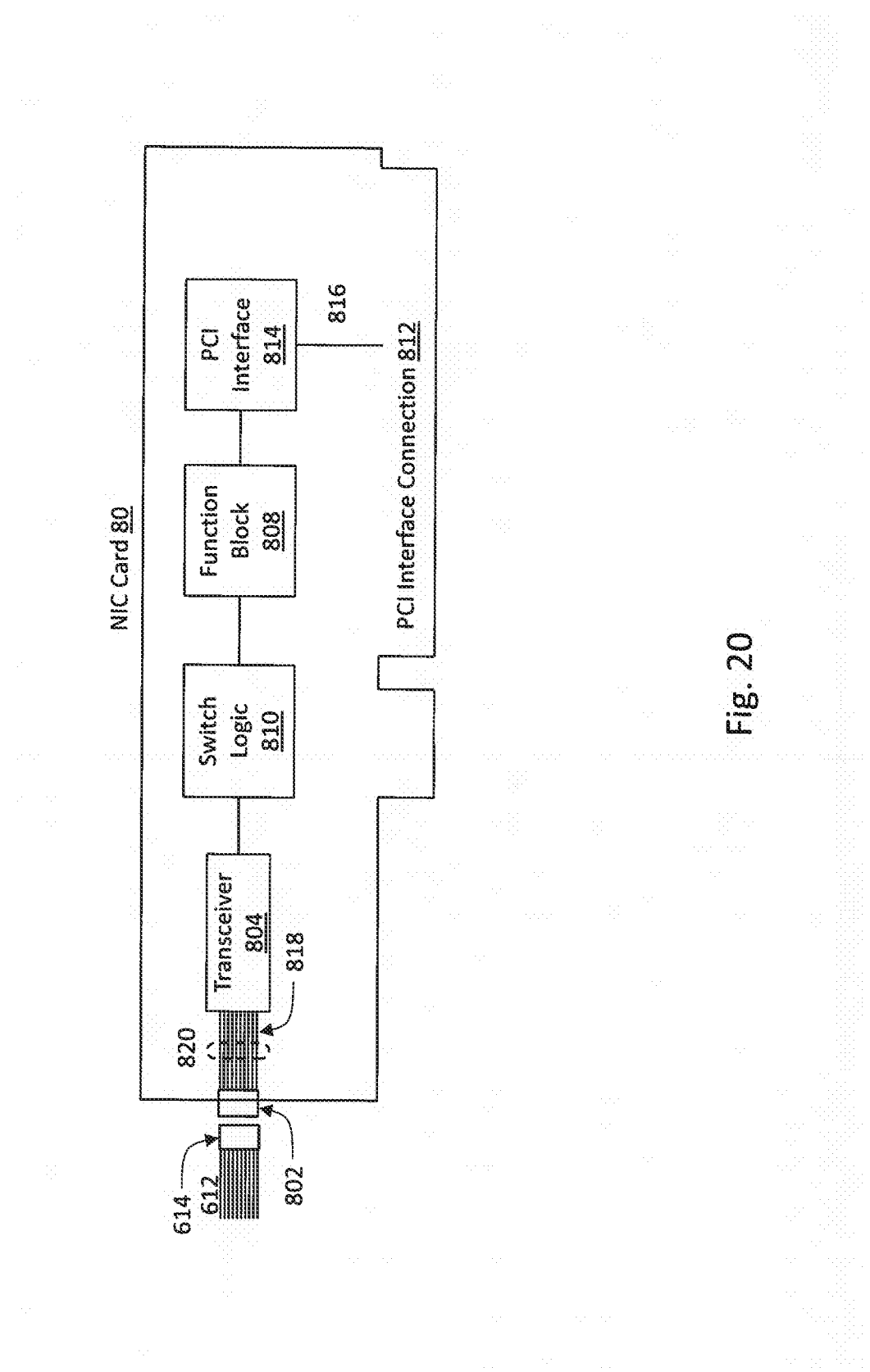
FIG. 20 is a block diagram of an embodiment of a NIC card architecture according to the present disclosure.

Referring to FIG. 20, a Network Interface Card (NIC) 80 within a server 104 contains a switch 810 on the card where each switch port within the switch 810 has the capability to interconnect any of the input ports 818 in the set of ports 820 to any of the output ports 818 in the set of ports 820 where the set of ports 820 is limited only by the switch 810 size and connectors installed on the NIC 80.

In one embodiment, this switch 810 and port connectors can be built into a server main board (not shown). In another embodiment, the circuitry may be part of a plug in card to the server 104. In any embodiment, the capability allows the switch 810 on the NIC Card 80 to be able to transfer data between the server itself via the PCI interface connector 812 and any single port 818 on the switch interface connector. The capability also exists to allow the server to transfer data between itself via the PCI interface connector 812 and multiple ports 818 simultaneously as part of a multicast, broadcast, or other similar multiport transfer mechanism.

The capability of a switch 810 within the server also permits the switch 810 to receive data from one ingress port 818 and transfer it out to a secondary port 818 under the control of the switch 810 without involving the CPU or packet processing logic of the server. Likewise, the switch 810 can receive data from one ingress port 818 and transfer it out to two or more secondary ports 818 as part of a multicast, broadcast, or other similar multiport transfer mechanisms under the control of the switch 810 without involving the CPU or packet processing logic of the server.

Figure 21:
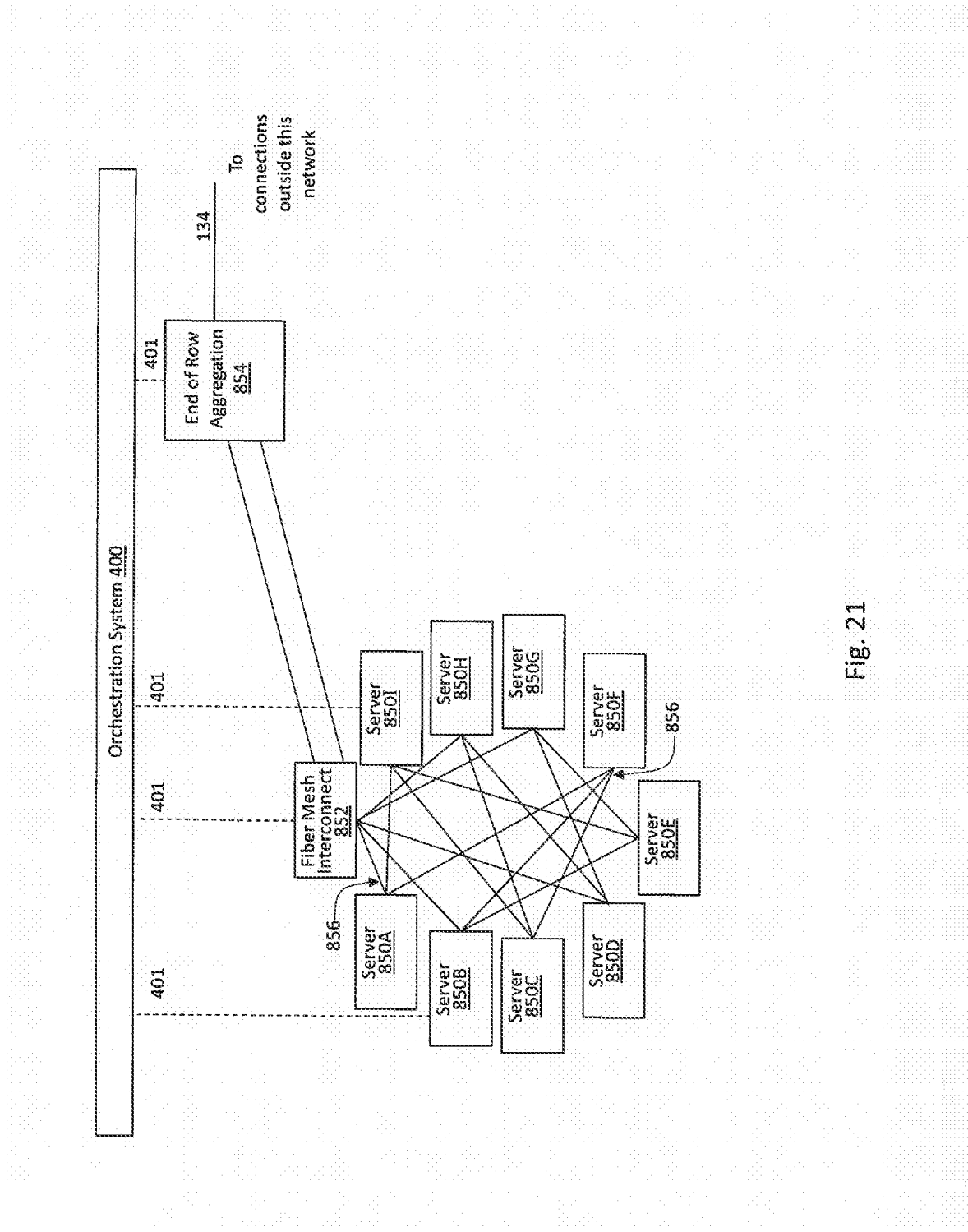
FIG. 21 is a block diagram of a data center network topology according to the present disclosure.

FIG. 21 is an exemplary embodiment of a small, server based data center network utilizing servers with onboard switch NICs 800. Each server 850 can be connected to one or more of the other servers 850 by network connection paths 856. The number of connection paths 856 per server are determined by the size of the switch logic 810, number of ports in the transceiver 804, and the connectors 802 on the NIC card 800. In this arrangement, the CPU in each server 850 can communicate directly to any server 850 which has a direct connection path 856 between the servers. The CPU in each server 850 can communicate directly to any server 850 where there is no direct connection path 856 between the two servers 850 by sending the packets to a server 850 to which it has a direct connection path 856 which in turn will forward the packets to the destination server 850. For example, server 850A could send a packet to server 850F which in turn would forward the packet to server 850B. In an alternate configuration the intermediary server 850F programs a direct connection within the switch logic 810 of the intermediary server 850F. Server 850A can then communicate directly to server 850B via the connection set up in server 850F.

In instances where a direct connection creates an input port to output port connection within switch 810, the server CPU is not needed to forward the data stream between the input port and output port. This permits server 850A to create a protocol independent data stream or encrypted data stream and send it directly to server 850F.

In another embodiment, a network can also include storage devices equipped with NIC 800.

In another embodiment, a small network can be expanded by connecting some of the direct connection paths 856 to Fiber Mesh Interconnects 852 or other aggregation methods which in turn couple the data streams to an end of row aggregation or other switch.

Furthermore, the architecture permits this server switch logic 810 to connect to traditional switch products in order to create connections to larger network endpoints. The protocols supported in the switch 810 may involve Ethernet, fiber channel, or other protocols. The connectors 802 can include copper interfaces, such as Cat 5, Cat 6, Cat 7, other RJ45 implementation variations, Fiber channel interfaces, optical interfaces including but not limited to FC, SC, ST, LC, MPO, MXC type connections.

The NIC 80 may have LEDs to indicate the port status of each individual port and LEDs for the state of the overall device. The LED blink pattern will be defined for each application. The LED color or colors may also be defined to indicate certain conditions. The NIC 80 may have an LCD display on the enclosure to indicate the status of each individual port 818 and/or the state of the overall device.

Another improvement of the data center network of the present disclosure is the provision of a NIC 80 to support the capability of obtaining intelligent information from within the NIC 80 itself, thus improving the accuracy of the readings and permitting direct reporting of the physical cable information to the managing software. In this embodiment, the connectors can include copper interfaces, such as Cat 5, Cat 6, Cat 7 other RJ45 implementation variations, Fiber channel interfaces, optical interfaces including but not limited to SC, ST, FC, LC, MPO, MXC type connections.

Figure 22:
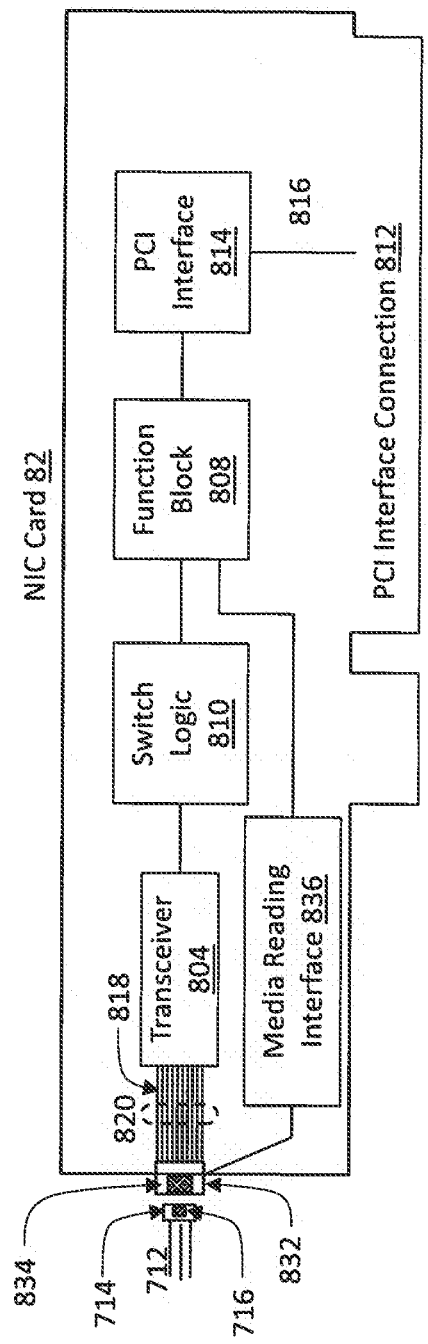
FIG. 22 is a block diagram of another embodiment of a NIC card architecture according to the present disclosure.

Referring to FIG. 22, the architecture of the present disclosure also permits the implementation of the capability to interpret cable information from cables connected to the NIC 82, by obtaining intelligent information from within the cables. In addition to interfacing to standard cables 612, adapter 832 has the capability, via interface 834, to detect the presence of a cable connector 612 or 712 inserted into intelligent adapter 832, and in the case of intelligence equipped cable connector 714, read specific cable information by reading the information in cable media 716. To ascertain cable information, the NIC 82 may be designed with ninth wire technologies interfaces, RFID tagging technology interfaces, connection point ID (CPID) technology interfaces, or other cable managed intelligence technologies. In another embodiment, the NIC 82 may be designed with one or more of these different technology interfaces in order to provide the capabilities of supporting more than one particular managed intelligent technology.

Each NIC 82 equipped with intelligent cable interfaces has the capability to determine the cable presence and/or cable information available to the interface depending upon the information provided from the intelligent cable. In this embodiment, Media Reading Interface 836 can read the physical cable information obtained from media interface 716 on cable connector 714 and report this information to the orchestration system 400 via the main board CPU (not shown).

The cable information read from media interface adapter 716 via media interface 834 by media reading interface 836 and provided to the main board CPU may include for each cable connection of the cable type, cable configuration, cable length, cable part number, cable serial number, and other information available to be read by media reading interface logic 836. This information is collected by media reading interface logic 836 and passed to the CPU via PCI Interface 814 over PCI Interface Bus 816. The CPU then reports the information to orchestration system 400. Orchestration System 400 can use this information along with information received from other data center network devices to map out the end-to-end connection paths of each cable connected in the data center.

The orchestration system 400 implements a method which provides end-to-end information regarding the overall path and the intermediary connections which make up and end-to-end path.

The orchestration system 400 collects the physical layer intelligent managed connectivity data from each switch, server, storage devices, interconnect panel, cross connect panel, and other devices in the network which have managed interconnect capabilities.

Figure 23:
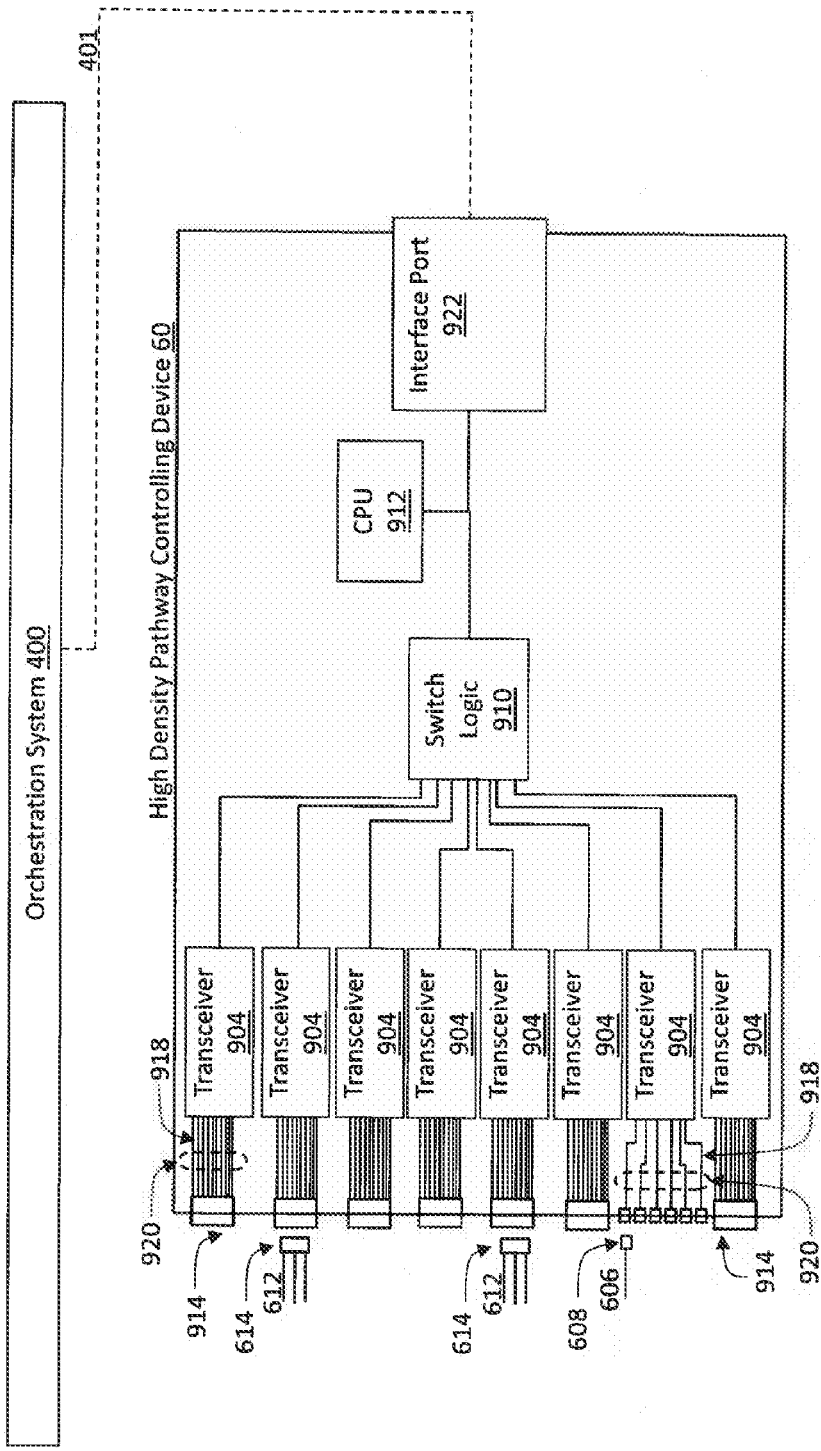
FIG. 23 is a block diagram of an embodiment of a high density pathway controlling device architecture according to the present application.

A new High Density Pathway Controlling Device 60 is defined as shown in FIG. 23 with built in multiport transceiver modules 904 inside the High Density Pathway Controlling Device 60 rather than the SFF cages on the exterior of the device where SFP, SFP+, QSFP, or other modules can be plugged into the High Density Pathway Controlling Device 60. The intention is to significantly increase the density of a switch or router.

The small footprint of multiport transceivers 904 allows multiple transceivers 904 within the High Density Pathway Controlling Device 60 to increase the physical number of connections within the High Density Pathway Controlling Device 60 more than a standard switch or router with SFF module cages.

In another embodiment, the use of the multiport transceivers 904 permits a smaller device physical size due the elimination of the space requirements necessary for a similar port density switch incorporating SFF module cages.

By incorporating denser transceiver modules 904 inside the High Density Pathway Controlling Device 60, the number of connections per module increases. Furthermore, the placement of the transceiver modules 904 inside the High Density Pathway Controlling Device 60 can be staggered with respect to each module in order to more tightly pack the modules inside the device.

The second aspect of the High Density Pathway Controlling Device 60 is to introduce the use of high density fiber connectors such as MPO, MXC, and other connectors 914 which have a high fiber count and small footprint. This permits effective use of the panel space for the module connections inside the High Density Pathway Controlling Device 60.

Figure 24:
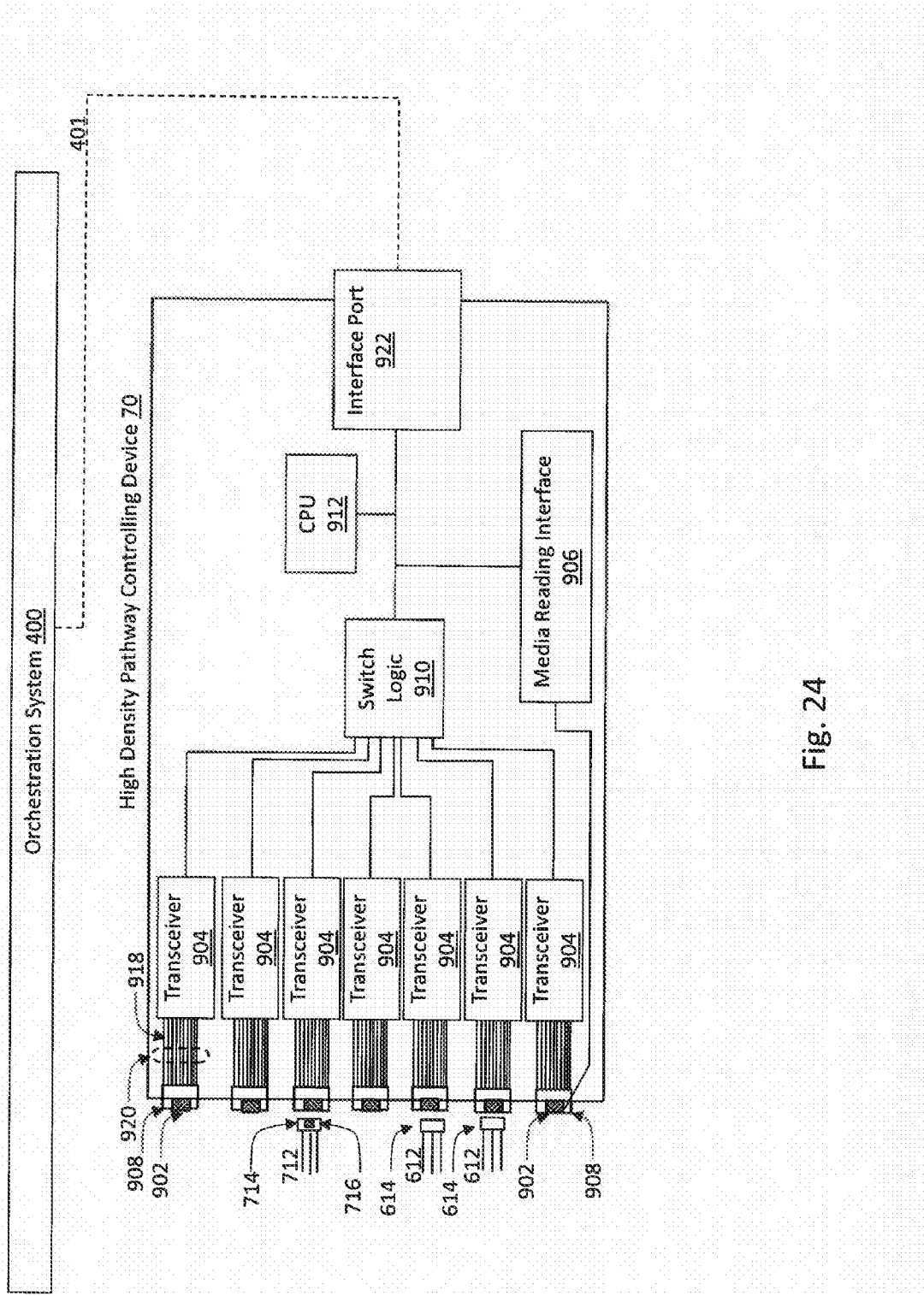
FIG. 24 is a block diagram of another embodiment of a high density pathway controlling device architecture according to the present application.

FIG. 24 shows the addition of physical identification technologies such as ninth wire technologies, RFID tagging, Connection Point Identification (CPID), and other technologies on the High Density Pathway Controlling Device 70. Each High Density Pathway Controlling Device 70 has the capability to determine the cable presence and or cable information available to the interface depending upon the information provided from the intelligent cable. This information is collected by the Media Reading Device 906 and passed to the CPU 912. The CPU 912 then reports the information via the Fiber Mesh Interconnect Port 922 to the orchestration system 400.

In one embodiment, the High Density Pathway Controlling Device 70 may be designed with ninth wire technologies interfaces. In another embodiment, the High Density Pathway Controlling Device 70 may be designed with RFID tagging technology interfaces. In another embodiment, the High Density Pathway Controlling Device 70 may be designed with CPID technology interfaces. In another embodiment, the High Density Pathway Controlling Device 70 may be designed with other managed cable intelligence technologies. In another embodiment, the High Density Pathway Controlling Device 70 may be designed with one or more of these different technology interfaces in order to provide the capabilities of supporting more than one particular managed intelligence technology in an application. This application may have the different technologies separate in the same assembly or may be used to bridge interfaces of different intelligence technologies to each other for example.

This capability permits the orchestration system 400 to be able to identify each cable connection connected to the High Density Pathway Controlling Device 70.

Another improvement of the data center network of the present disclosure is to dynamically map fibers 918 in a configuration where all the fibers 920 within a connector can be utilized, and at the same time provide multi-rate communications capabilities within the same connector. The concept that 10 Gbps ports may migrate to 40 Gbps ports and/or to 100 Gbps ports is achievable by the bonding of fibers together to form multifiber connections between endpoints. The 40 Gbps bandwidth is achieved by running four fibers in one direction for the 40 Gbps Transmit path and four fibers in the other direction for the 40 Gbps Receive path. Similarly, the 100 Gbps bandwidth is achieved by running 10 fibers in one direction for the 100 Gbps Transmit path and 10 fibers in the other direction for the 100 Gbps Receive path. The current IEEE 802.3 proposed implementation for these schemes is to use eight fibers (four transmit and four receive fibers) in a 12 fiber MPO for 40 Gbps connection. This means four fibers are wasted in this implementation scheme. For 100 Gbps communications, there are two implementation schemes. One uses 10 fibers out of 12 in a 12 fiber MPO with the remaining 2 fibers not used in the transmit path plus 10 fibers out of 12 in a 12 fiber MPO with the remaining two fibers not used in the receive direction. The other implementation scheme uses 10 fibers for transmit plus 10 fibers for receive with four fibers unused in a 24 fiber MPO. In these cases, migrating from a connection comprising only of 10 Gbps connections to 40 Gbps or 100 Gbps requires both reconfiguring the fiber transmit and receive connections inside the connectors and also the loss of use of some of the fibers in the connector.

The data center network according to the present disclosure permits the dynamic mapping of fibers 918 to a configuration where all the fibers 920 can be used within a connector, and at the same time provide multi-rate communications capabilities within the same connector. An improved implementation scheme is to utilize all the fibers 920 within the connector and allow the interconnect panels and switches to separate the individual links 918 from the bonded links. This also permits expansion of 12 fiber MPO configurations to 24, 48, 72, or other MPO fiber combinations in order to be able to support multi-rate and multifiber applications in the same connector.

This also permits expansion of 12 fiber MPO configurations to MXC or other high fiber count connectors 612 or 712 without the requirements of predefined bonding configurations for multifiber applications in the same connector.

In a different embodiment, single transmission connections such as 1 Gbps, 25 Gbps, 56 Gbps speeds, or other speeds may be intermixed in the same MPO or MXC or other high fiber connector with CWDM, DWDM, and other multicolored fiber transmission schemes.

Figure 25:
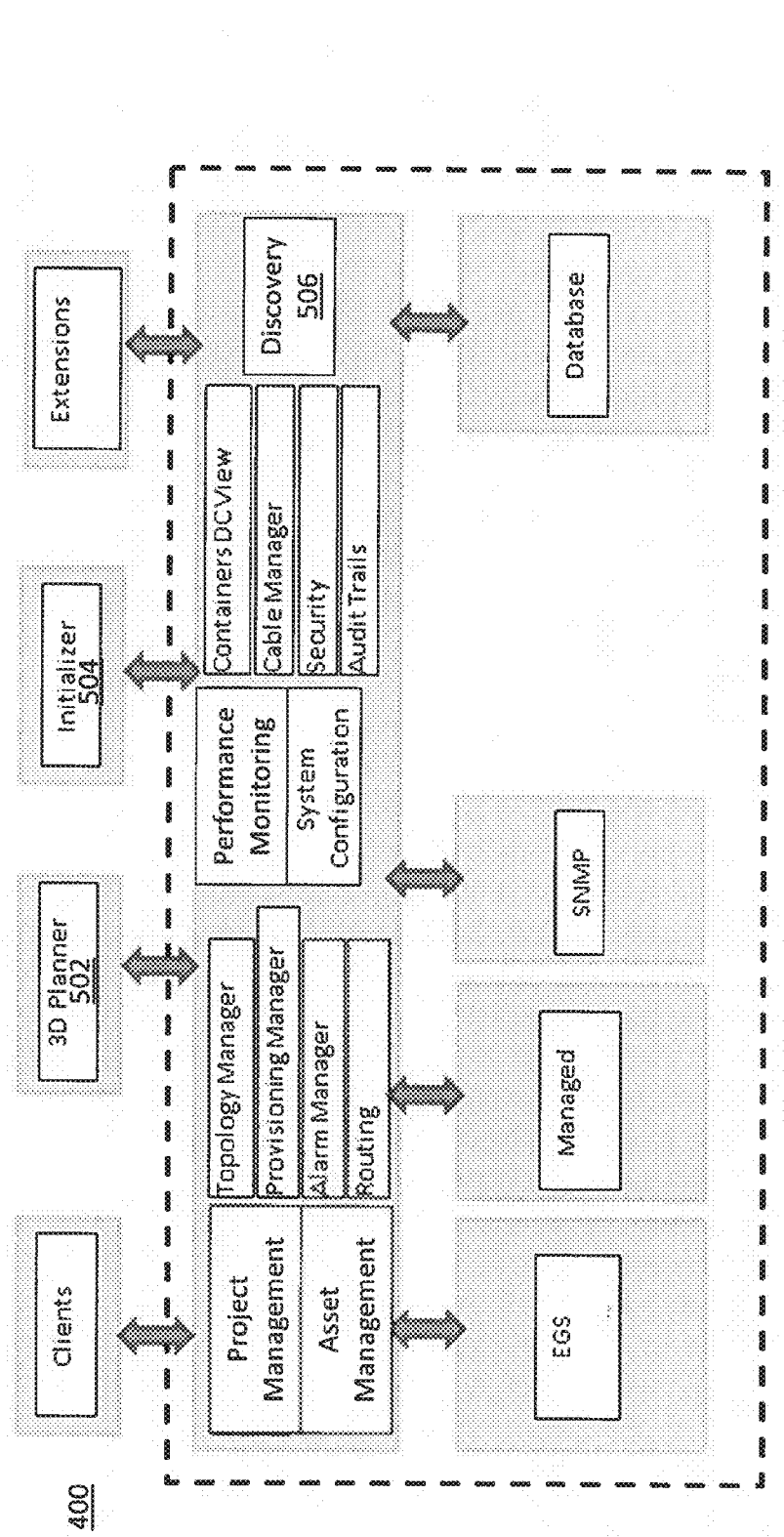
FIG. 25 is a block diagram of an embodiment of the architecture of the orchestration system according to the present disclosure.

Referring now to FIGS. 25-32, the orchestration system 400 is described in more detail. The orchestration system 400 is similar to a network management system that includes conventional processes, such as Network Topology, Routing, Alarm, Security, Performance, Audit Trails, Project Management, Inventory, and other processes, as shown in FIG. 25. In addition, the orchestration system 400 of the present disclosure includes a number of network management functions that conventional management systems do not have, including discovery of the physical infrastructure of the data center network, determining the physical topology of the data center network, tracking physical network devices and other network components, and providing definable network paths.

In one embodiment, the functions of the orchestration system 400 of the present disclosure can be set forth as, planning functions, initialization functions, and operation functions. Planning functions allow users to architect the physical layout of the data center network without physically being at the site. Initialization functions help network device deployment processes perform much quicker than traditional processes. With the initialization functions, the orchestration system 400 can do initial configuration in minutes which is much faster than the hours needed for conventional initial configuration. Operation functions provide element configuration, monitoring, diagnostics, tracking, and network management.

Planning is done via a three dimensional planning application (3D Planner) 502. With the 3D Planner 502, a designer can architect their network infrastructure by defining the building, datacenter, zones, rows, racks, rack network devices, modules, port and cable types via dragging and dropping components from the toolbar. Components in the 3D Planner 502 are called containers. Each container is associated with a unique identification which is used to determine its identity and address. The 3D elevation of racks and rack units provide realistic visualization and identification. The 3D Planner 502 also provides a template for faster and easier replication of existing configurations.

The 3D Planner 502 can be incorporated into the orchestration system 400 or it can be a standalone client that communicates with orchestration system 400. The 3D Planner 502 screen layout can be implemented in many different arrangements. In one embodiment, 3D Planner 502 screen layout has a tool bar on top and component bar at the left side. The main screen is where devices and the data center area are shown. The first view of the main screen is a map view where the screen displays icons representing the data center buildings. The toolbar is similar to other applications, which contain buttons for easy access to functions, such as "save", "delete", "export", and other configuration commands. The component bar contains multiple tabs; each tab contains a group of components. The component bar has a building tab containing icons to define buildings; the data center tab contains icons to define a data center within the building; the zone tab contains icons to define a zone within data center, the row tab contains icons to define a row within the zone; the rack tab contains various racks for creating racks within the row; the rack unit tab contains different models and types of rack network devices, such as servers, switches, and other devices, as well as different types of patch panels; the module tab contains various models of modules (blades) that can be added to a rack unit space; the port tab allows the user to add ports to the device; the harness and cable tab allows the user to add cabling. These tabs also contain icons representing template configurations. In other embodiments, the 3D Planner 502 may have different arrangements or layouts of tool bars, component bars, icons, and other layout differences.

In general, the user can define a building, data center, zone, row, rack, rack unit, module, port, harness and cable by dragging component icons in the component bar over to the main view and dropping the icons at user selected locations. In one embodiment, once the user drops the icon on the main view, usually a pop-up dialog appears asking the user to enter information (such as dimension, IP address, name, description and so on). Once the user clicks "apply", a message is sent to orchestration system 400. The orchestration system 400 receives a "create" message and creates the component, and then sends back an acknowledgement. When the 3D Planner 502 receives the acknowledgement from the orchestration system 400 with the information provided, it draws the component in the main view as a visual acknowledgement to the user. The components are drawn in 3D as if the user is looking at the actual physical structure. The same procedure applies to all components. To add a rack unit, the user double clicks on the rack to bring it into edit mode, in which user can drag and drop the rack units on to the rack. The same basic procedure is followed when the user wants to add modules onto rack unit. In other embodiments, the process can be implemented in different steps or techniques to achieve the same objectives.

Adding cables between network devices can be done in several ways such as 3D Planner 502 network tree views, bundle cable views, or point of use view. When using network tree views, clicking a button in the toolbar brings up a tree form dialog which has source and destination trees. In this dialog, the user can expand the tree to select a port on one tree and drag and drop that port over to another port on the other tree to connect the two ports together. Once dropped, a "confirm" message is shown. Once the "apply" button is pressed, a message is sent to the orchestration system 400 requesting to make the connection from the selected port. The orchestration system 400 grants that request and sends back an acknowledgement which triggers a completion indication at the GUI side.

Figure 26:
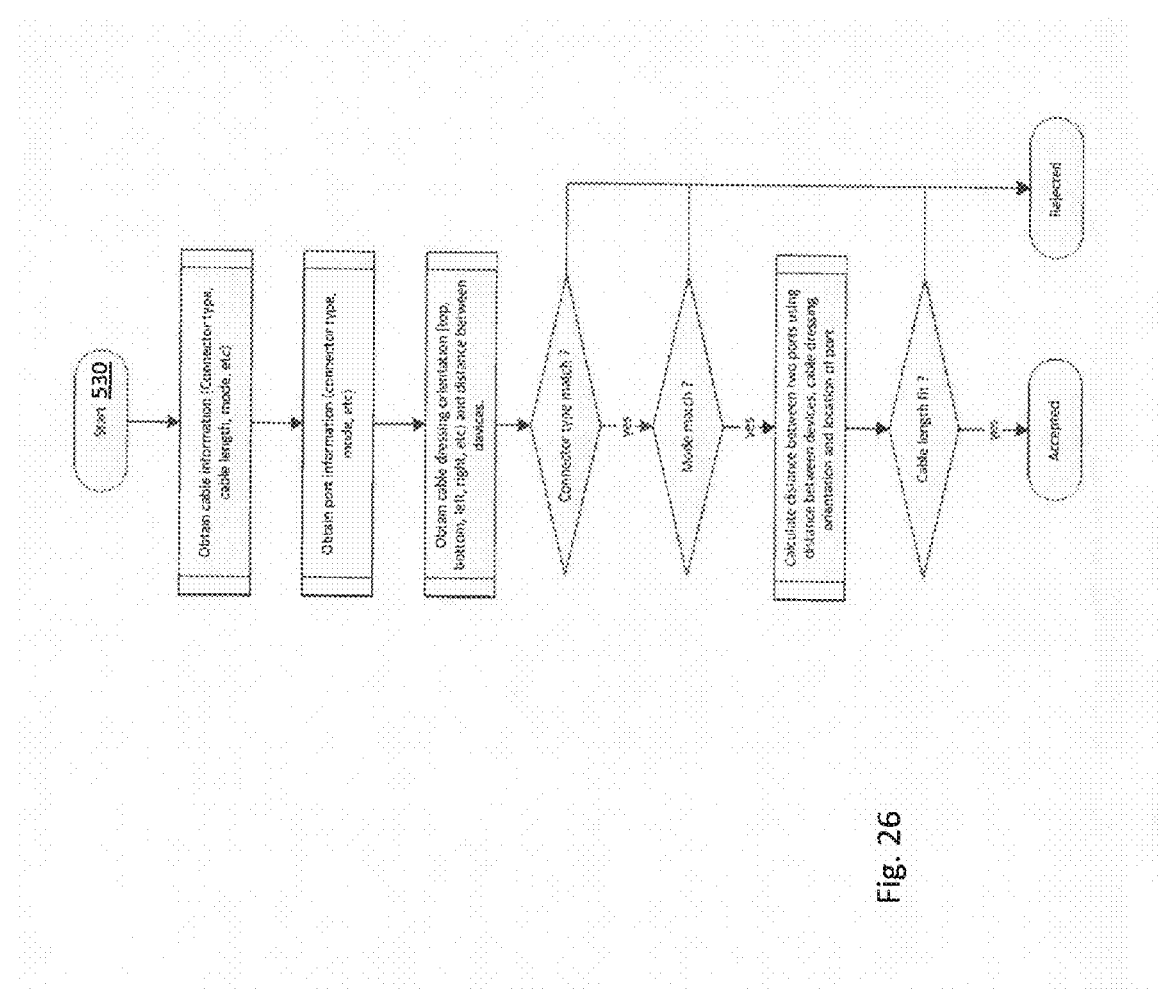
FIG. 26 is a flow diagram for a cable verification process according to the present application.

Referring now to FIG. 26 which shows a flow diagram for the cable verification process 530 for the cable assignment process. When adding single cables or bundled cables to the 3D Planner 502 topology view, the cables can be dragged and dropped onto the rack. A single cable may be a simplex or duplex cable intended to provide one port connection at each end of the fiber and/or copper wiring cable. A bundled cable is a predefined collection of fibers and/or copper wiring made to fit certain rack configurations. A bundled cable may have multiple fibers or copper wires with a single connection at either end or a cable with multiple connectors at one or both ends in the case of break out cables. When a single or bundled cable is dropped in place, the association between cable connection and device ports are made. Cables can also be added in the device view where each port is visible. This point of use method allows the user to perform a mouse click on the ports to bring up a dialog for the user to select the destination port. Before accepting a cable connection, a series of verifications such as connector compatibility, cable length, port compatibility, and device locations is executed by the 3D Planner 502 to ensure the configuration is compatible with the intended path connection.

Once a certain plan configuration is completed, the plan can be saved as a template so that it can be replicated quickly and easily. When the user clicks on a button to save the plan as a template, a request is sent to the orchestration system 400, the orchestration system 400 process saves the template and sends it back to the 3D Planner 502. The 3D Planner 502 receives the acknowledgement and then draws an icon representing the saved template in the component bar.

After the planning phase and the installation of the components is completed, the initialization process can be carried out. The components can be already configured devices from inventory or un-configured devices sent from a manufacturer. Initialization is done via the 3D Initializer 504 which instructs the user (e.g., a technician) step by step to configure the network devices.

The 3D Initializer 504 may be incorporated into the orchestration system 400 or it may be a standalone client application that communicates with orchestration system 400. When starting up, the 3D Initializer 504 logs in and retrieves information from the orchestration system 400. Once receiving a valid response from the orchestration system 400, it will draw the rack, rack units, and other components similar to the layout in the 3D Planner 502. The user selects a device in a rack and clicks the "configure" button. A dialog box will pop up with instructions for the user to follow. Different types of instructions may be provided depending on the type of device to be initialized. In general the process is as simple as selecting a device, plugging the cable in to the device as directed by the initializer, clicking the "configure" button, waiting until the process is complete, and then moving to the next device in the view. During the configuration process, the 3D Initializer 504 retrieves information that was entered during the planning process and selectively picks the information to send down to the device.

Once the initialization process 504 is complete, the system is in an operational ready state with basic functionality. The orchestration system 400 operation functions provides additional functionality to the orchestration system 400, including data flow management, definition and identification, track-able and monitor-able physical connections, physical path discovery, segment disconnect detection, and bit error rate detection.

Figure 27:
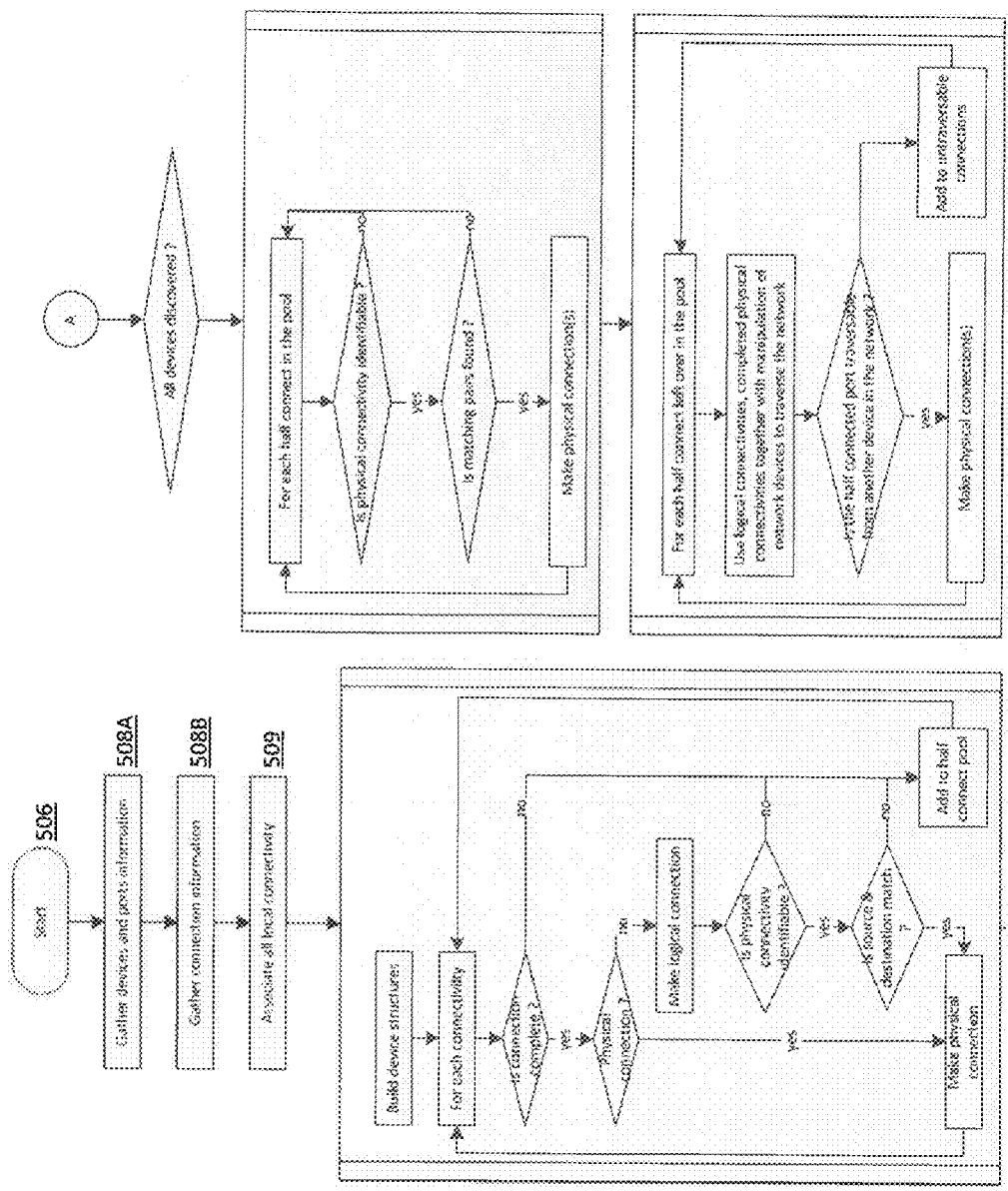
FIG. 27 is a flow diagram for an embodiment of a discovery process according to the present application.
Figure 28:
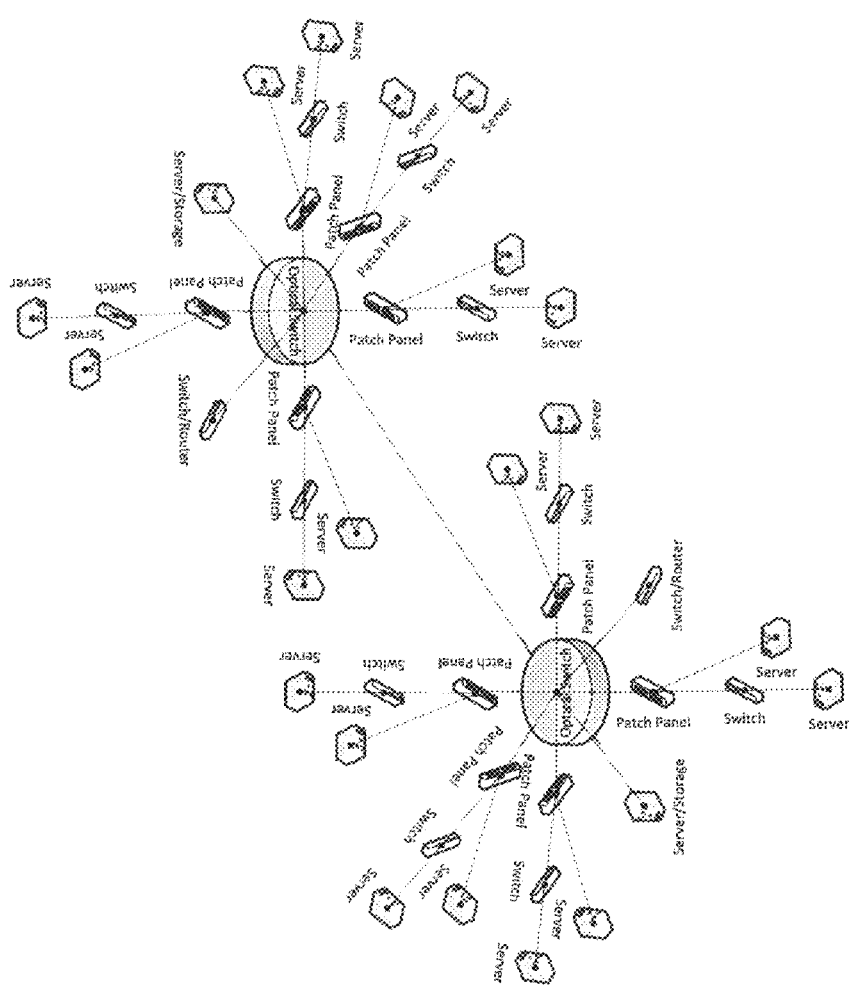
FIG. 28 is a block diagram of a data center network topology according to the present disclosure.
Figure 29:
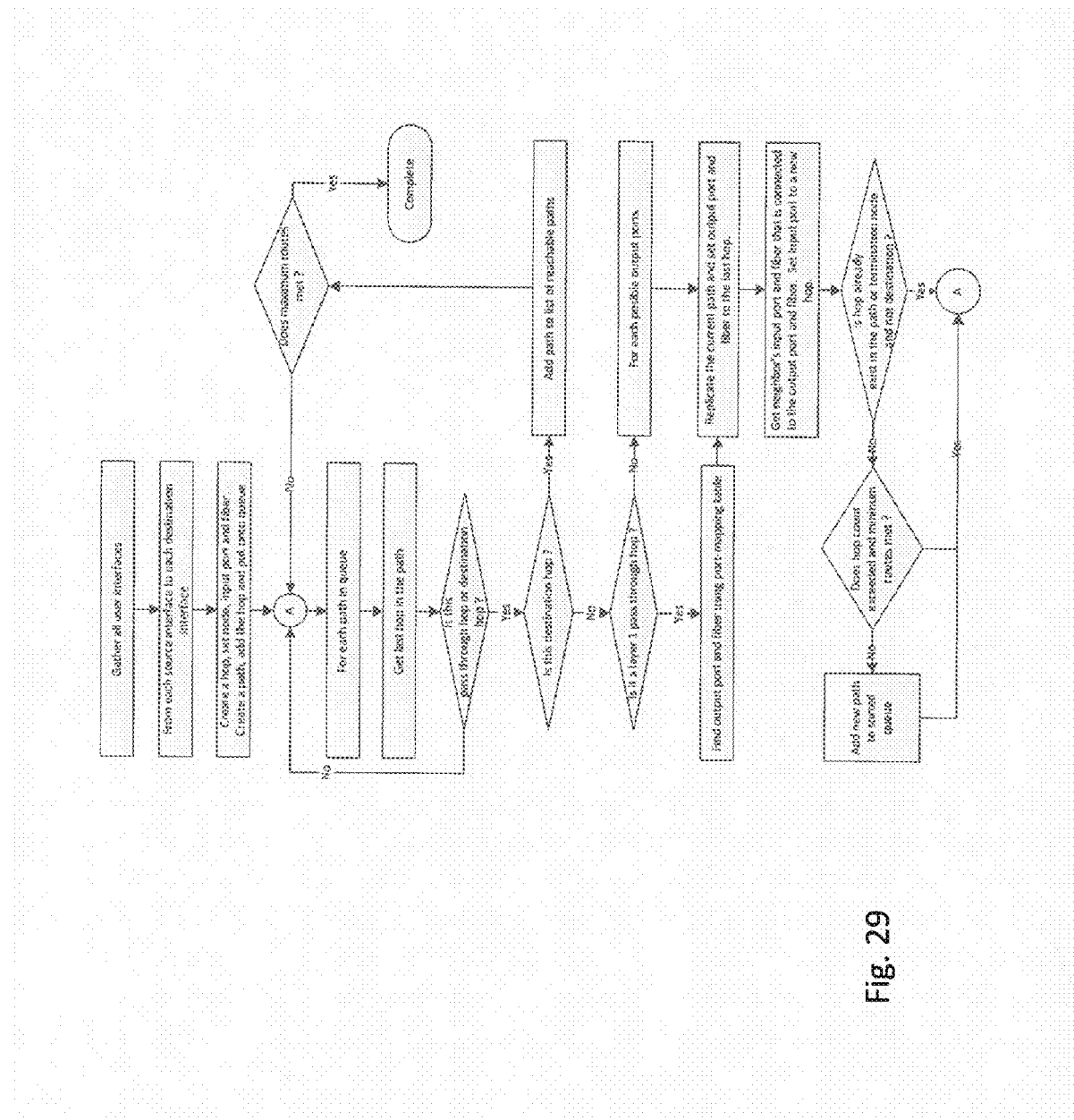
FIG. 29 is a flow diagram for determining connectivity paths with constraints in accordance with one embodiment of the present disclosure.

In operation, the orchestration system 400 discovers the network using the discovery process 506 algorithm, which is described below and shown in FIG. 27. The discovery process 506 includes two operations: a collection process 508 and an association process 509. The collection process 508 is carried out by multiple controller modules to gather all network device information, all port information, and all connectivity information between network devices. The association process 509 correlates the network device information, port information, and connectivity information between network devices to create relationships and connectivity between the devices in the data center network.

FIGS. 11, 22, and 24 show examples of different network devices and cables equipped with intelligent physical identification technologies, such as ninth wire technologies, RFID tagging, Connection Point Identification (CPID), and other technologies which are used to identify cable related information at each port in a network device. Depending upon the technology implemented in the device, the device may be able to ascertain the presence of a cable, the type of cable, the length of the cable, make of cable, serial number of the cable, and other physical information available to be determined from the device port. Knowing the information of both ends of a cable from different device ports, the association process 509 can identify a physical cable connection and between two devices and therefore can identify a cable as a known physical cable between two devices. With the physical cable information, the association process 509 uses algorithms to identify cable connections and associate unidentifiable cables with device port connections.

Each controller also associates connectivity information to create connections between network devices within its coverage. All information is then sent to a central association process 509 module to finish the association. The results are presentable in graphical form, similar to network diagram shown in FIG. 28.

Physical layer cabling additions: In an exemplary embodiment, the orchestration system 400 can display newly added cabling on a physical topology view of the network, or updated by manual processes, guided by prompts from the orchestration system 400 alerting the operator by highlighting, flashing, or blinking colors, symbols, or text on top of affected devices. Cabling will appear on the graphical representation of the network topology, with, in one embodiment, blinking yellow dots on top of the either end of the cable, prompting the user to acknowledge the new cable. In other embodiments, different visual indications can be used to represent the same scenarios as detailed here.

Physical layer cabling removal: When a cable is physically removed from the network, the cable remains in the topology view; however the color of the cable is changed to red, as well as the devices attached to either end of the cable. The cable is also identified by red blinking dots at both ends of the cable, prompting the operator to acknowledge the change in topology.

If the cable that was removed is added back into the network in the same position, the cable and attached devices change back to their default colors. The cable is displayed in the network topology with yellow blinking dots, prompting the user to acknowledge the change at both ends.

If a different or replacement cable is added back into the network in the same position rather than the original cable, the cable and attached devices change back to their default colors. The cable is displayed in the network topology with orange blinking dots, prompting the user to acknowledge the change at both ends.

Intrusion detection: In an exemplary embodiment, if one cable end is removed and replaced with a different cable connection, a red blinking dot is placed on the end of the cable that changed in the network topology, while the other end which was not disconnected remains clear. The red blinking dot identifies that the cable end change was not authorized.

After the discovery process 506 is completed, the orchestration system 400 compares the discovered data center network with the planned network to determine if there are any differences. The differences are presented to the user for resolution decisions. The detection mechanism checks for differences in device information, connectivity, and cable characteristics. Also, once discovery process 506 is completed and validated, the orchestration system 400 then calculates all possible paths from one end device to another following the process set forth in FIG. 29 to ensure the path configurations do not violate the rules pertaining to the maximum number of routes, maximum length of the route, and maximum number of hops per connection.

As new devices are added to the network and as these devices are connected to the orchestration system 400 via the management interface 401 they are discoverable by the orchestration system 400 and the newly discovered devices will be displayed in the 3D Planner 502.

Given identifiable physical paths, the orchestration system 400 discovers physical layer connectivity, the physical topology network, and the logical network. Physical topology is a network topology that represents one or more physical devices connected to each other by physical cables. Logical topology is a network topology that represents one or more physical and/or logical devices connected with each other by physical cables and/or logical connections. Using the characteristics of physical connectivity in combination of the data link layer and higher layers that provide logical connectivity, the orchestration system 400 operations functions can traverse the network to find the missing physical connections. In order for the orchestration system 400 to calculate data stream route paths and locate fault conditions, it first identifies each device and cable segment in the network.

FIGS. 30a-30c are exemplary network diagrams illustrating the capability of the orchestration system 400 discovery process during conditions where a particular cable in the network is not readily identifiable. The orchestration system 400 first discovers the existence of network devices and then the orchestration system 400 associates all ports based on cable identification number to create connections 516 between the network devices. FIG. 30a indicates a scenario where all connections (also referred to as "links") 516 are identifiable.

FIG. 30b shows one possible scenario where a connection 518 between host A 510A and host B 510B is unidentifiable at the edge of the network, and the unidentifiable connection 518 in this exemplary scenario is the connection between switch B 512B and host B 510B. The host B 510B can be any network device. In this situation, the discovery process discovers a path exists between host A 510A and host B 510B, and also that all connections 516 are identifiable except the unidentifiable connection 518. In order to recognize the unidentifiable connection 518, the orchestration system 400 can determine the connectivity using a number of different methods, including: a) a Layer 2 and above connectivity method, b) a path traversal method using a route calculation method, and/or c) the fact that there is only one path capable of reaching host B 510B from switch B 512B. In FIG. 30b, using Layer 2 and above connectivity method indicates that there is at least one path going from the switch A 512A to host B 510B. Using a path traversal process, the orchestration system 400 determines the available paths from switch A 512A through the patch panels 514 to host B 510B. From the outgoing port of the patch panel 514, the orchestration system 400 can reliably make a determination that the outgoing port on switch B 512B is connected to host B 510B via an unidentifiable cable, and can now classify this cable based on the known connectivity information.

FIG. 30c shows another exemplary unidentifiable connection in the data center network, this time between patch panels. The discovery of the unidentifiable connection in FIG. 30c is similar to that of the process that was done for the network type in FIG. 30b. In this situation, a connection can be established from host A 510A to host B 510B over different segment combinations. Since most of the segments are identifiable by the orchestration system 400, the orchestration system 400 can draw out the potential paths that a data stream can take from host A 510A to host B 510B. However with the unidentifiable path, the orchestration system 400 only knows that a cable has been connected to patch panel 514B and a cable has been connected to patch panel 514C. The orchestration system 400 needs to know if these two endpoints are related as part of the same cable or if the connections are associated with different cables that connect to different endpoints. The orchestration system 400 traverses the path from the switch 512A to patch panel 514C and then traverses a data stream through the unidentifiable cable port on patch panel 514C, and then monitors the other unidentifiable ports in the network to locate the other end of the cable which in this case terminates on patch panel 514B. The orchestration system 400 now has connection knowledge of the previously unidentifiable cable. Similarly, the orchestration system can run similar path traversal mechanisms for other types of network devices besides patch panels.

Figure 31:
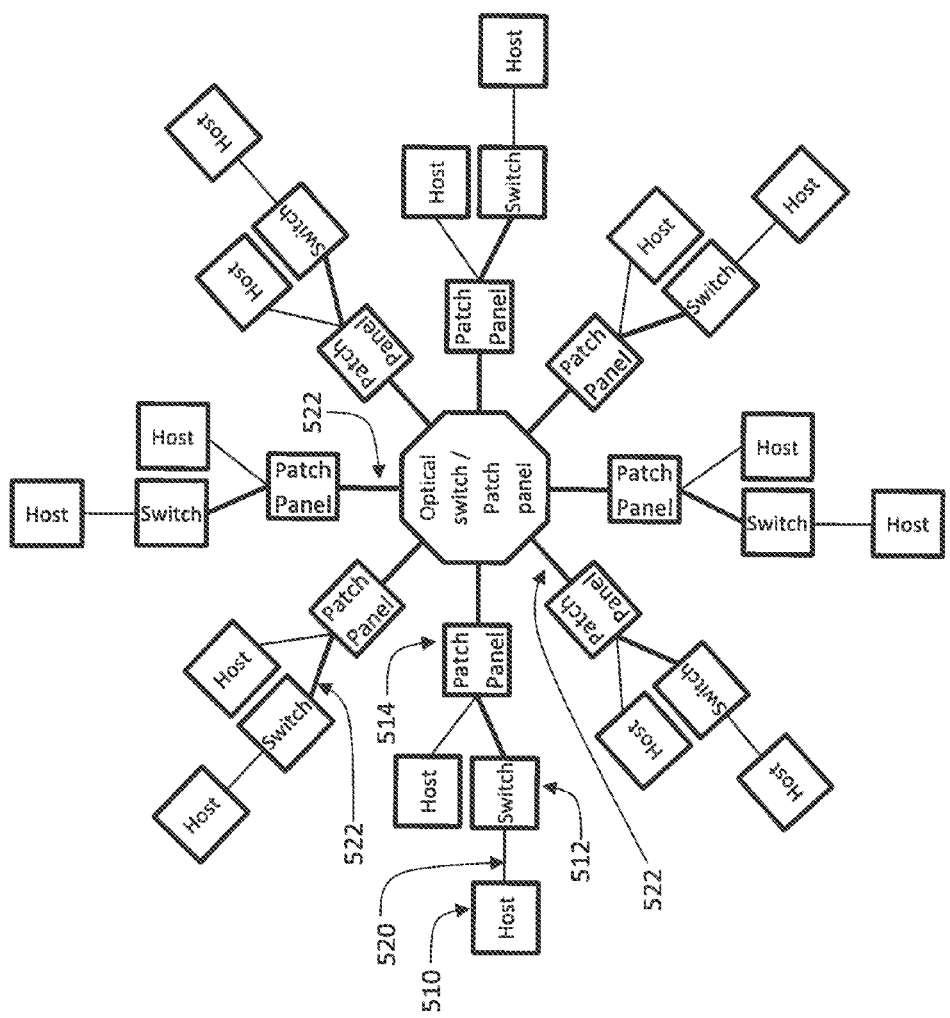
FIG. 31 is a block diagram of another embodiment of data center network topology according to the present disclosure.
Figure 32:
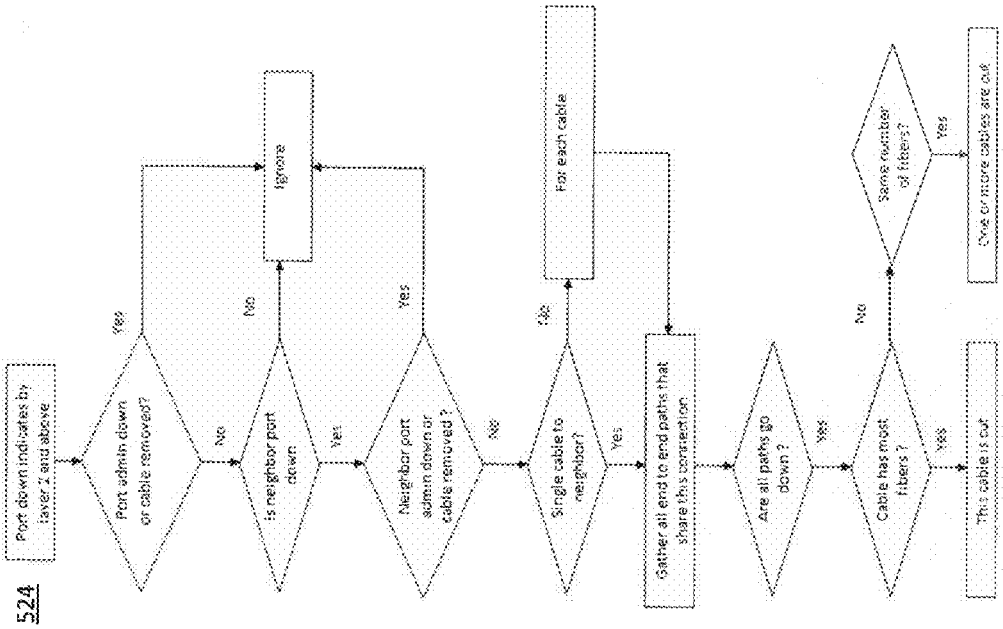
FIG. 32 is a flow diagram for detecting broken data paths in accordance with one embodiment of the present disclosure.

The orchestration system 400 operation functions can also detect connection tampering. If one of the connections in a managed data center network is removed, added, or changed, the orchestration system 400 can detect the change of state and provide an indication of the tampering in real time. Even if the connection is cut, the orchestration system 400 is able to determine which cable is cut. FIG. 31 shows how devices are interconnected across the network and is used as an example to illustrate the method of segment-disconnect detection. At the edges, data is sent to and from a single point 510 over a single cable 520 and then aggregated in a switch 512 or patch panel 514 which combine paths from multiple hosts 510 into bundled cables 522 where at the center of the data center network, data is sent to and from many intermediary points over bundled cables 522. Given this, the orchestration system 400 considers connections near the center over bundled cables as connections that can share data from many sources. Thus, the orchestration system 400 concludes that connections at an edge affect only the edge and the data going into that edge, whereas connections near the data center network center affects many edges and their data. With that relationship, the orchestration system 400 can locate a broken connection using a relational algorithm. With the visibility of the network, the orchestration system 400 uses the relational algorithm 524 to look at the edges to see what data paths are broken and then traverse to the common point(s) of breakage. The relational algorithm 524 is represented in FIG. 32.

In addition, the orchestration system 400 discovery mechanisms can reverse the topology network into physical elevation structure, as in a 3D rack elevation in the 3D Planner 502, and using the identification numbers that were assigned to the network devices at the time of planning.

With the orchestration system 400 operations functions, data paths can be assigned or shown based on a particular data type, application, protocol, or end-to-end path route. For example, with a VLAN, a user can choose to show where a certain VLAN will travel through the data center network. Alternatively, the user can define a specific path as to how a particular VLAN will travel through the data center network. Data paths can be viewed by selecting a device, an application type, protocol type, or a flow in the topology graph. Upon selection, a highlighted path is shown in the topology graph. When a certain path is used to deliver specific traffic, the user can choose endpoints and select one of the paths for an available application type or protocol type. Assigned paths can be viewed, changed, or removed.

The orchestration system 400 also allows setting up monitoring sessions or ports via point and click in the topology map. Tapping is the duplication or splitting of data paths for routing the secondary path typically to a network monitoring device in order to perform troubleshooting, recording, logging, performance measuring and other functions on the data stream. The created monitoring sessions and monitoring ports are saved in the database which can be easily retrieved and managed.

End-to-End Server Encryption

The data center network according to the present disclosure is capable of providing a secure connection from server to server through the data center network. A secure path is dedicated to the server to server connection and is not available to any other network device in the data center network. Because the orchestration system 400 has knowledge of all the paths and devices in the data center network, it can assign specific paths through devices and enable a secure connection between the two endpoints. The secure connection appears as a clear channel path, where from the source server to a destination server, packets are not processed, but merely forwarded bit by bit. This also enables the devices at the connection endpoints to encrypt any part or all parts of any PDU (Protocol Data Unit) type before transmission.

In addition to providing a clear channel path that enables transfer of encrypted PDUs, the physical layer is secured as well through Connection Point Identification (CPID) enabled cabling, CPID readers on panels, switches and every network device where CPID cables connect. All CPID readers feed connectivity information up to orchestration system 400.

Since the orchestration system 400 can determine the connectivity of every cable segment and intermediate network device and panel in a path between two endpoints, the orchestration system 400 can determine if there are physical layer breaches in the network and has the capabilities to isolate the breach down to a device or single cable segment. Once a breach has been detected, the orchestration system 400 can automatically disable data transmission from the endpoint device ports as a means of stopping unauthorized tapping, monitoring, or rerouting of network data.

What is claimed is:

1. A data center network, comprising:
   one or more rows, wherein each row has one or more racks, and wherein each of the one or more racks has at least one network device and at least one top-of-rack network switch; and
   at least one end-of-row fiber mesh interconnect in communication with each top-of-rack network switch within the same row of the one or more rows, such that each top-of-rack network switch has a direct connection to every other top-of-rack network switch within the same row;

wherein each top-of-rack network switch comprises:
a housing having one or more connection panels; and
a set of ports, wherein each port within the set of ports is configured to receive data streams from at least one network device within each of the one or more racks, and to transmit data streams to at least one network device within each of the one or more racks, wherein each port in the set of ports includes a connector and at least one transceiver optically coupled to the connector, and wherein the connector is mounted to the one or more connection panels for connecting to the at least one network device and the end-of-row fiber mesh interconnect; and wherein the fiber mesh interconnect, comprises:
a housing having one or more connection panels, wherein each connection panel includes a plurality of connectors; and
a plurality of individual optical fibers within the housing and connected between one or more of the plurality of connectors to provide a direct optical fiber connection between connectors, the plurality of individual optical fibers being adhered to a thin film medium and arranged on the thin film medium in a predefined mapping.

2. The data center network according to claim 1, further comprising an orchestration system that controls the flow of data streams between each top-of-rack switch and each end-of-row fiber mesh interconnect.

3. The data center network according to claim 1, wherein the one or more rows are arranged in double wide racks configured as even and odd rack pairs, and wherein the top-of-rack network switch has at least 42 ports to provide connections to at least 42 network devices in each of the double wide racks.

4. The data center network according to claim 1, wherein the one or more rows are arranged in double wide racks configured as even and odd rack pairs, and wherein the top-of-rack network switch has at least 84 ports to provide connections to at least 84 network devices in each of the double wide racks, and at least 24 port connections to end of row switches in the data center and at least 4 port connections to every other data center network switch in each double wide rack in the data center row.

5. The data center network according to claim 1, wherein each port connector can be one of a CAT 6, CAT 6E, CAT 7, FC, SC, ST, LC, MPO, or MXC connector.

6. The data center network according to claim 1, wherein one or more of the network devices are equipped with a physical identification system.

7. The data center network according to claim 6, wherein the physical identification system comprises one of ninth wire technologies, RFID tagging, or connection point identification.

8. A data center network fiber mesh interconnect device, comprising:
a housing having one or more connection panels, wherein each connection panel includes a plurality of connectors; and
a plurality of individual optical fibers within the housing and connected between one or more of the plurality of connectors to provide a direct optical fiber connection between connectors, the plurality of individual optical fibers being adhered to a thin film medium and arranged on the thin film medium in a predefined mapping.

9. The data center network fiber mesh interconnect device according to claim 8 wherein the plurality of optical fibers are adhered to one or more thin films.

10. The data center network fiber mesh interconnect device according to claim 9, wherein the plurality of optical fibers can be routed on the thin film in defined connection patterns between the connectors in a single layer.

11. The data center network fiber mesh interconnect device according to claim 9, wherein the plurality of optical fibers can be routed on the thin film in defined connection patterns between the connectors overlapping previously adhered fibers creating a multi-layer fiber interconnection.

12. The data center network fiber mesh interconnect device according to claim 8, wherein one or more of the plurality of connectors comprise multi-fiber connectors and one or more single fiber connectors, and the predefined mapping between the connectors includes:
connecting an optical fiber from one position within a multi-fiber connector to a different position in a different multi-fiber connector;
connecting an optical fiber from one position within a multi-fiber connector to a different position within the same multi-fiber connector;
connecting an optical fiber from one position within a multi-fiber connector to a single fiber connector; or
connecting an optical fiber from one single fiber connector to a different single fiber connector.

13. The data center network fiber mesh interconnect device according to claim 12, wherein the multi-fiber connectors comprise MPO or MXC connectors, and the single fiber connectors comprise FC, SC, ST and LC connectors.

14. The data center network fiber mesh interconnect device according to claim 8, wherein one or more of the plurality of connectors comprise multi-fiber connectors, and the predefined mapping between the multi-fiber connectors includes:
connecting an optical fiber from one position within a multi-fiber connector to a different position in a different multi-fiber connector; or
connecting an optical fiber from one position within a multi-fiber connector to a different position within the same multi-fiber connector.

15. The data center network fiber mesh interconnect device according to claim 14, wherein the multi-fiber connectors comprise MPO or MXC connectors.

16. The data center network fiber mesh interconnect device according to claim 8, wherein one or more of the plurality of optical fibers extend through an opening within the housing such that the one or more of the plurality of optical fibers are external to the housing to provide direct connections to external devices.

17. The data center network fiber mesh interconnect device according to claim 16, wherein the external optical fibers are encased in a protective sheathing to protect the optical fibers from damage.

18. A data center network, comprising:
one or more rows, wherein each row has one or more racks, and wherein each of the one or more racks has at least one network device and at least one top-of-rack fiber mesh interconnect; and
at least one end-of-row fiber mesh aggregation in communication with each top-of-rack fiber mesh interconnect within the same row of the one or more rows, such that each top-of-rack fiber mesh interconnect has a direct connection to every other top-of-rack fiber mesh interconnect within the same row;

wherein each top-of-rack fiber mesh interconnect comprises:
- a housing having one or more connection panels, wherein each connection panel includes a plurality of connectors; and
- a plurality of individual optical fibers within the housing and connected between one or more of the plurality of connectors to provide a direct optical fiber connection between connectors, the plurality of individual optical fibers being adhered to a thin film medium and arranged on the thin film medium in a predefined mapping.

19. The data center network according to claim 18, wherein each end-of-row fiber mesh aggregation comprises:
- a housing having one or more connection panels, wherein each connection panel includes a plurality of connectors; and
- a plurality of optical fibers within the housing and connected between one or more of the plurality of connectors in a predefined mapping to provide a direct optical fiber connection between connectors.

* * * * *